(12) United States Patent
Qu et al.

(10) Patent No.: US 11,760,766 B2
(45) Date of Patent: Sep. 19, 2023

(54) IONIC LIQUIDS CONTAINING QUATERNARY AMMONIUM AND PHOSPHONIUM CATIONS, AND THEIR USE AS ENVIRONMENTALLY FRIENDLY LUBRICANT ADDITIVES

(71) Applicant: UT-Battelle, LLC, Oak Ridge, TN (US)

(72) Inventors: Jun Qu, Oak Ridge, TN (US); Huimin Luo, Knoxville, TN (US); Xin He, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 17/078,668

(22) Filed: Oct. 23, 2020

(65) Prior Publication Data

US 2022/0033423 A1    Feb. 3, 2022

Related U.S. Application Data

(60) Provisional application No. 63/057,323, filed on Jul. 28, 2020.

(51) Int. Cl.
    *C07F 9/54*          (2006.01)
    *C10M 169/04*     (2006.01)
    (Continued)

(52) U.S. Cl.
    CPC ......... *C07F 9/5463* (2013.01); *C10M 137/08* (2013.01); *C10M 169/04* (2013.01);
    (Continued)

(58) Field of Classification Search
    CPC .............. C10M 137/08; C10M 169/04; C10M 2205/0206; C10M 2207/2805;
    (Continued)

(56) References Cited

U.S. PATENT DOCUMENTS 2,798,083 A    7/1957   Bell et al.
2,956,954 A    10/1960   Hoare et al.
(Continued)

OTHER PUBLICATIONS

Burton, J., "Saving Two Birds with One EAL", Lubes'N'Greases, Sep. 2016, pp. 32-36, vol. 22, Issue 9.
(Continued)

*Primary Examiner* — James C Goloboy
(74) *Attorney, Agent, or Firm* — Scully, Scott, Murphy & Presser, P.C.

(57) ABSTRACT

An ionic liquid composition having the following generic structural formula:

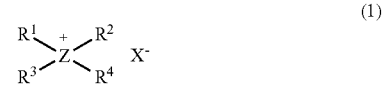

wherein Z is N or P, and $R^1$, $R^2$, $R^3$, and $R^4$ are independently selected from hydrogen atom and hydrocarbon groups having one to four carbon atoms with optional interconnection to form a cyclic group that includes Z, and wherein $R^1$, $R^2$, $R^3$, and $R^4$ are all hydrocarbon groups when Z is P, and $X^-$ is a phosphorus-containing or carboxylate anion, particularly an organophosphate, organophosphonate, or organophosphinate anion, or a thio-substituted analog thereof containing hydrocarbon groups with at least three carbon atoms. Also described are lubricant compositions comprising the above ionic liquid and a base lubricant, wherein the ionic liquid is dissolved in the base lubricant. Further described are methods for applying the ionic liquid or lubricant composition onto a mechanical device for which lubrication is beneficial, with resulting improvement in friction reduction, wear rate, and/or corrosion inhibition.

11 Claims, 13 Drawing Sheets

(51) Int. Cl.
*C10M 137/08* (2006.01)
*C10N 20/00* (2006.01)
*C10N 30/00* (2006.01)
*C10N 30/06* (2006.01)

(52) U.S. Cl.
CPC .............. *C10M 2205/0206* (2013.01); *C10M 2207/2805* (2013.01); *C10M 2207/401* (2013.01); *C10M 2209/1033* (2013.01); *C10M 2223/043* (2013.01); *C10N 2020/077* (2020.05); *C10N 2030/06* (2013.01); *C10N 2030/64* (2020.05)

(58) Field of Classification Search
CPC .... C10M 2207/401; C10M 2209/1033; C10M 2223/043; C10N 2020/077; C10N 2030/06; C10N 2030/64; C07F 9/5463
See application file for complete search history.

(56) References Cited

U.S. PATENT DOCUMENTS

| | | | |
|---|---|---|---|
| 3,205,173 A | 9/1965 | Hepplewhite et al. | |
| 4,472,288 A * | 9/1984 | Frost, Jr. | C10M 137/10 508/159 |
| 5,674,822 A | 10/1997 | Schlosberg et al. | |
| 5,783,531 A | 7/1998 | Andrew et al. | |
| 5,885,946 A | 3/1999 | Laemsae | |
| 6,071,863 A | 6/2000 | Benda et al. | |
| 7,476,645 B2 | 1/2009 | Rosenbaum et al. | |
| 8,268,760 B2 | 9/2012 | Habeeb et al. | |
| 8,455,407 B2 | 6/2013 | Schmidt-Amelunxen et al. | |
| 9,062,899 B2 * | 6/2015 | Boesmann | C09K 5/047 |
| 9,435,033 B2 | 9/2016 | Qu et al. | |
| 9,481,852 B2 | 11/2016 | Psillas | |
| 9,556,394 B2 | 1/2017 | Khelidj et al. | |
| 9,670,237 B2 | 6/2017 | Dai et al. | |
| 9,957,460 B2 | 5/2018 | Qu et al. | |
| 2009/0036334 A1 * | 2/2009 | Schwab | F03D 80/70 508/110 |
| 2010/0187481 A1 * | 7/2010 | Bodesheim | C10M 171/001 252/399 |
| 2010/0227785 A1 * | 9/2010 | Habeeb | C10M 141/10 508/370 |
| 2015/0232777 A1 * | 8/2015 | Qu | C10M 137/12 508/369 |
| 2016/0024421 A1 * | 1/2016 | Qu | C10M 137/12 508/463 |
| 2017/0096614 A1 * | 4/2017 | Khatri | C10M 129/32 |

OTHER PUBLICATIONS

Marougy, T., "Making the Move to Eco-friendly Hydraulic Fluids", MachineDesign.com, Aug. 7, 2013, pp. 37-39.

Nagendramma, P., et al., "Development of ecofriendly/ biodegradable lubricants: An overview", Renewable and Sustainable Energy Reviews (2012), Received Dec. 22, 2010, Received in revised form Aug. 18, 2011, Accepted Sep. 7, 2011, Available online Oct. 4, 2011, pp. 764-774, 16.

United States Environmental Protection Agency, "Environmentally Acceptable Lubricants", EPA 800-R-11-002, Nov. 2011, 27 pages.

International Search Report & Written Opinion dated Aug. 27, 2021 received in International Application No. PCT/US2021/043260.

* cited by examiner

| Treatment to mineral water | | Survival | | | | | Reproduction | | |
|---|---|---|---|---|---|---|---|---|---|
| Lubricant concentration in water: 10 ppm Additive concentration in water: 0.5 ppm | | Number of survivals | | | | Survival rate (%) | Total # of neonates | # of Neonates per survival | *Relative to control |
| | | Day-1 | Day-2 | Day-3 | Day-7 | | | | |
| EAL base oil | Neat PAG | 10 | 10 | 10 | 10 | 100 | 476 | 47.6±8.8 | 117% |
| Conventional additive | PAG+5%ZDDP | 0 | 0 | 0 | 0 | 0 | 0 | 0 | 0 |
| Previously developed ILs | PAG+5%[P$_{8888}$][DEHP] | 0 | 0 | 0 | 0 | 0 | | | |
| | PAG+5%[N$_{888}$H][DEHP] | 10 | 6 | 0 | 0 | 0 | | | |
| Candidate eco-friendly ILs | | | | | | | | | |
| Phosphonium-phosphate ILs | PAG+5%[P$_{4442}$][DEP] | 10 | 10 | 10 | 10 | 100 | 453 | 45.3±5.9 | 124% |
| Aprotic alkyl ammonium-phosphate ILs | PAG+5%[N$_{4441}$][DBP] | 10 | 10 | 10 | 10 | 100 | 494 | 49.4±4.1 | 135% |
| Protic alkyl ammonium-phosphate ILs | PAG+5%[N$_{222}$H][DBP] | 10 | 10 | 9 | 9 | 90 | 495 | 55.0±20.2 | 100% |
| | PAG+5%[N$_{444}$H][DBP] | 10 | 10 | 9 | 9 | 90 | 506 | 56.2±20.0 | 99% |
| | PAG+5%[N$_{666}$H][DBP] | 9 | 5 | 2 | 1 | 10 | 3 | 0.3±1.1 | 1% |
| | PAG+5%[N$_{888}$H][DBP] | 3 | 0 | 0 | 0 | 0 | 0 | 0 | 0 |
| Cyclic ammonium-phosphate ILs | PAG+5%[NMPPR][DBP] | 10 | 10 | 10 | 9 | 90 | 529 | 58.7±16.4 | 107% |
| | PAG+5%[NMM][DBP] | 10 | 10 | 7 | 7 | 70 | 428 | 61.1±39.7 | 111% |
| | PAG+5%[Mor][DBP] | 10 | 10 | 9 | 9 | 90 | 492 | 54.6±15.9 | 99% |
| Ammonium-carboxylate IL | PAG+5% [N$_{8888}$][C$_{17}$H$_{35}$COO] | 10 | 6 | 0 | 0 | 0 | 0 | 0 | 0 |

*Control tests with Dilute Mineral Water were repeated four times and had 100% survival rate

FIG. 2B

| | Friction coefficient | Wear rate ($10^{-9}$ mm$^3$/N·m) |
|---|---|---|
| Neat PAG | $0.083^{\pm 0.006}$ | $2.21^{\pm 0.80}$ |
| ZDDP | $0.092^{\pm 0.002}$ | $1.42^{\pm 0.25}$ |
| [P$_{8888}$][DEHP] | $0.076^{\pm 0.006}$ | $1.08^{\pm 0.42}$ |
| [N$_{888}$H][DEHP] | $0.063^{\pm 0.002}$ | $0.16^{\pm 0.04}$ |
| [P$_{4442}$][DEP] | $0.082^{\pm 0.007}$ | $1.45^{\pm 0.57}$ |
| [N$_{4441}$][DBP] | $0.061^{\pm 0.001}$ | $0.12^{\pm 0.03}$ |
| [N$_{222}$H][DBP] | $0.060^{\pm 0.001}$ | $0.13^{\pm 0.03}$ |
| [N$_{444}$H][DBP] | $0.061^{\pm 0.001}$ | $0.13^{\pm 0.01}$ |
| [N$_{666}$H][DBP] | $0.063^{\pm 0.002}$ | $0.11^{\pm 0.01}$ |
| [N$_{888}$H][DBP] | $0.064^{\pm 0.003}$ | $0.16^{\pm 0.08}$ |
| [NMPPR][DBP] | $0.062^{\pm 0.003}$ | $0.26^{\pm 0.01}$ |
| [NMM][DBP] | $0.061^{\pm 0.002}$ | $0.17^{\pm 0.01}$ |
| [Mor][DBP] | $0.062^{\pm 0.002}$ | $0.23^{\pm 0.01}$ |
| [N$_{8888}$][C$_{17}$H$_{35}$COO] | $0.087^{\pm 0.009}$ | $4.97^{\pm 0.59}$ |

FIG. 3C

IONIC LIQUIDS CONTAINING QUATERNARY AMMONIUM AND PHOSPHONIUM CATIONS, AND THEIR USE AS ENVIRONMENTALLY FRIENDLY LUBRICANT ADDITIVES

CROSS REFERENCE TO RELATED APPLICATION

The present application claims benefit of U.S. Provisional Application No. 63/057,323, filed on Jul. 28, 2020, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present invention relates generally to the fields of ionic liquids, and more particularly, to their application as additives in lubricating oils, such as engine and motor oils. The present invention also generally relates to lubricant compositions containing environmentally friendly base lubricants (polyalkylene glycols, vegetable oils, synthetic ester oils, polyalphaolefins, and water) and environmentally friendly additives therefore.

BACKGROUND OF THE INVENTION

Conventional lubricants in hydropower turbomachinery are typically mineral oil-based, which have low biodegradability and often are toxic to environmental receptors. A significant amount of the lubricants sold worldwide are eventually released into the environment through leaks, spills, volatilization, and other losses. Leaks and spills from hydropower facilities are difficult to isolate from streams and contaminate water resources directly, posing a serious threat to the aquatic ecosystem. Leaks and operational discharges lead to 36.9-61 million liters of lubricating oil per year, a major source being hydraulic fluids that are widely used in industrial machinery, large ships, and off-road vehicles, and more than $300 million are spent annually in initial responses without even counting the long-term costs (D. S. Etkin, *Proceedings of the 33rd AMOP Technical Seminar on Environmental Contamination and Response* (2010), vol. 1, pp. 529-553).

In view of the known harmful effects of conventional petroleum-based lubricants on the environment, environmentally acceptable lubricants (EALs) have seen increasing demand in many industrial applications, such as hydropower turbomachinery, hydraulic systems, compressors, and manufacturing processes. There is a growing interest in eco-friendly lubricants for reducing negative impacts to human health, wildlife and ecosystems. There are five main types of EPA-approved EALs: water, vegetable oils, synthetic esters, polyalkylene glycols (PAGs), and polyalphaolefins (PAOs).

Anti-wear additives play a critical role in wear protection and are usually included in the base lubricant at low concentration, e.g., 0.1-2 wt % or 0.5-2 wt %. While the base lubricant helps to separate the contact surfaces and dissipate the heat, the lubricant additives play key roles, such as, for example: anti-oxidant to slow down aging of the oil, rust inhibitor to prevent the metal surfaces from rusting, anti-wear (AW) agent to protect the bearing surfaces from scuffing and wear, friction modifier to reduce the boundary friction at starts and stops, and anti-foaming to resist oil foaming. Some particularly well known conventional additives are the zinc dialkyldithiophosphates (ZDDPs). However, the ZDDPs are toxic because of the high zinc content and long-chain thiophosphate moiety. Conventional ashless (metal-free) additives, such as triaryl phosphorothionate, may have lower toxicity but their wear protection and thermal stability are often inferior. Notably, there remains a lack of eco-friendly, efficacious additives suitable for EALs. In addition, most conventional additives are designed to be compatible with mineral oils and may not be soluble or compatible in EALs, especially the water-soluble PAGs. Also, the environmentally driven trend to minimize waste oil disposal demands lubricating oils with longer functional lives, which demands stronger aging resistance for both the base lubricant and additives. Thus, there would be a significant benefit in anti-wear additives that are ecologically and environmentally friendly while being substantially efficacious and also compatible with EALs.

SUMMARY OF THE INVENTION

In one aspect, the present disclosure is directed to ionic liquids useful as environmentally friendly (eco-friendly) lubricant additives. The additives are more particularly anti-wear additives that are advantageously compatible with EALs, such as polyalkylene glycols (PAGs), vegetable oils, synthetic ester oils, polyalphaolefins (PAOs), or water, and are ecologically and environmentally friendly while being substantially efficacious in their anti-wear abilities. The anti-wear additives described herein are ionic liquids containing a quaternary ammonium or phosphonium cation and a phosphorus-containing (e.g., phosphate, phosphonate, or phosphinate) anion or carboxylate anion, and wherein hydrocarbon groups on the ammonium or phosphonium cation and the phosphorus-containing anions contain no more than four carbon atoms. The presently described ILs are further eco-friendly because they are free of metals, halogens (particularly chlorine, bromine, or iodine), and sulfur.

In some embodiments, the base lubricant is or includes a PAG. PAGs are of particular interest because of their high resistance to oxidation, low deposit, high viscosity index, and water solubility. The non-toxic, water-soluble PAGs, unlike hydrophobic oils, will dissolve in water in the event of a spill or leak from a hydropower system, which advantageously maintains compliance with the U.S. Clean Water Act's 'non-sheening rule'.

The ionic liquid additives described herein have the following generic structural formula:

(1)

wherein: Z is either N or P; $R^1$, $R^2$, $R^3$, and $R^4$ are each independently selected from hydrogen atom and hydrocarbon groups having one to four carbon atoms, wherein, optionally, two or three of $R^1$, $R^2$, $R^3$, and $R^4$ are interconnected to form a saturated or unsaturated cyclic group that includes Z as a ring heteroatom, and wherein $R^1$, $R^2$, $R^3$, and $R^4$ are all hydrocarbon groups when Z is P.

The anion (X⁻) in Formula (1) is selected from one of the following ions:

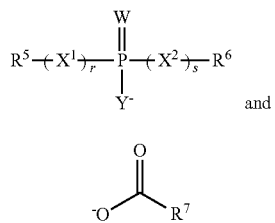

and (2)

(3)

wherein $R^5$ and $R^6$ are independently selected from hydrocarbon groups having one to four carbon atoms, and $R^5$ and $R^6$ optionally interconnect to form a ring; $R^7$ is a hydrocarbon group containing 1-20 carbon atoms; $X^1$, $X^2$, W, and Y are independently selected from O and S atoms; and subscripts r and s are independently selected from 0 and 1.

In another aspect, the present invention is directed to a lubricant composition in which the above anti-wear additive according to Formula (1) is dissolved in a base lubricant. In particular embodiments, the base lubricant is selected from the group consisting of polyalkylene glycols (PAGs), vegetable oils, synthetic ester oils, polyalphaolefins (PAOs), and water. Typically, the ionic liquid additive is included in the base lubricant in an amount of at least 0.1-10 wt %, or more particularly, in an amount of 0.1-5 wt %, or 0.1-3 wt %, or 0.1-2 wt %, or 0.1-1 wt %.

In another aspect, the present disclosure is directed to a method for reducing wear and/or reducing friction in mechanical components designed for movement by applying the above lubricant composition onto the mechanical components. The lubricant composition will reduce friction and/or wear of parts in contact with each other during operation of the device in which the mechanical components are located. The mechanical component can be any mechanical part known in the art for which lubricity could be beneficial. The mechanical component is typically constructed of metal, and can be, for example, a bearing, piston, turbine, fan, gear, shaft, axle, linkage, pump, motor, rotary blade, compressor, or engine, or component used in a manufacturing process.

As discussed later on in this disclosure, the present application reports successful development of the ionic liquids (ILs) described above as anti-wear additives. The ILs exhibit lower toxicity and exceptional lubricity compared with state-of-the-art commercial additives. Tribological and toxicity results conducted herein have confirmed that these ILs are substantially more effective in friction reducing and wear protection than conventional lubricant additives. Notably, in standard chronic aquatic toxicity tests using a model organism, *Daphnia*, selected exemplary ILs showed no negative impact on survival or reproduction of *Daphnia* while commercial additives or the previously reported ILs used for lubrication in the literature killed all *Daphnia*. The exemplary ILs also demonstrated 80-90% wear reduction than the commercial baseline additive. This class of novel lubricant additives improves machinery reliability and mechanical efficiency and at the same time minimizes the environmental impact.

BRIEF DESCRIPTION OF THE DRAWINGS

FIGS. 2A-2B. FIG. 2A shows 7-day chronic toxicity test procedure using an EPA protocol. FIG. 2B shows selected *Daphnia* survival and reproduction data (see full dataset in Tables 3 and 4).

FIGS. 3A-3C. Selected lubricity results (see full dataset in FIG. 4 and Table 5). FIG. 3A shows friction traces, FIG. 3B compares wear rates, and FIG. 3C shows average steady-state friction coefficient (last 200 m of sliding) and wear rates of neat PAG and PAG+0.5 wt % additive. Tribological test conditions: AISI 52100 steel ball (10 mm dia.) reciprocating sliding against M2 tool steel disc at 82° C., 100 N, 10 Hz oscillation, 10 mm stroke, for 1000 m sliding.

FIGS. 6A and 6D show top surface SEM imaging and EDS analysis for PAG+0.5 wt. % ZDDP and PAG+0.5 wt. % [N$_{4441}$][DBP], respectively.

FIGS. 6B and 6E show cross-sectional STEM imaging and EDS elemental mapping for PAG+0.5 wt. % ZDDP and PAG+0.5 wt. % [N$_{4441}$][DBP], respectively. FIGS. 6C and 6F show XPS core-level spectra for ZDDP and [N$_{4441}$][DBP] tribofilms, respectively.

DETAILED DESCRIPTION OF THE INVENTION

Figure 1:
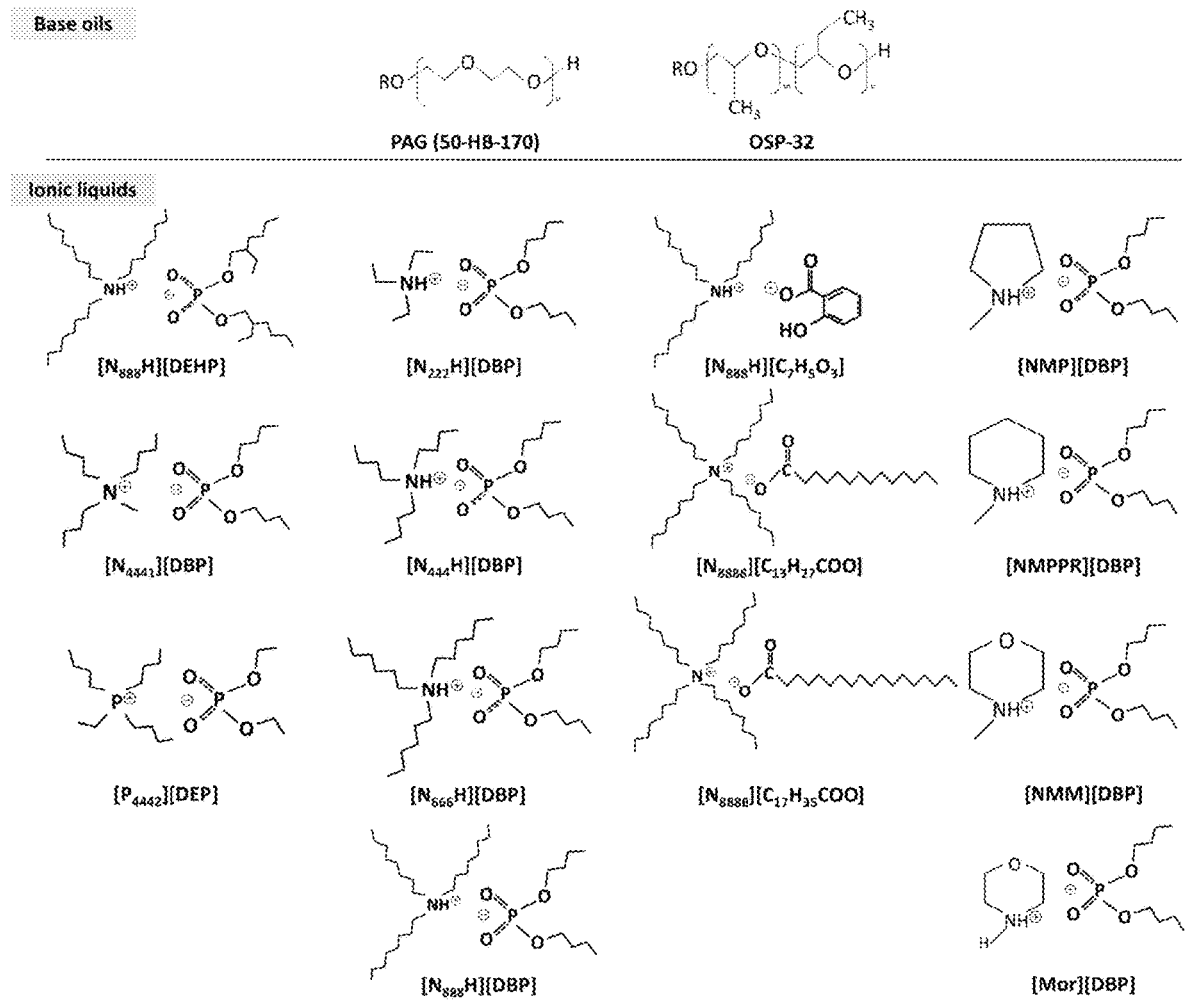
FIG. 1. Chemical structures of PAG and OSP-32 base lubricants and several ionic liquids tested.

As used herein, the term "hydrocarbon group" (also denoted by the group R) is defined as a chemical group composed solely of carbon and hydrogen, except that the hydrocarbon group may or may not be (i.e., is optionally) substituted with one or more fluorine atoms to result in partial or complete fluorination of the hydrocarbon group. In different embodiments, one or more of the hydrocarbon groups can contain, for example, 1, 2, 3, 4, 5, 6, 7, 8, 9, 10, 11, 12, 13, 14, 15, 16, 17, 18, 19, or 20 carbon atoms, or a number of carbon atoms within a particular range bounded by any two of the foregoing carbon numbers. Hydrocarbon groups in different compounds described herein, or in different positions of a compound, may possess the same or different number (or preferred range thereof) of carbon atoms in order to independently adjust anti-friction and anti-wear properties.

In a first set of embodiments, the hydrocarbon group (R) is a saturated and straight-chained group, i.e., a straight-chained (linear) alkyl group. Some examples of straight-chained alkyl groups include methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, and n-eicosyl groups.

In a second set of embodiments, the hydrocarbon group (R) is saturated and branched, i.e., a branched alkyl group. Some examples of branched alkyl groups include isopropyl (2-propyl), isobutyl (2-methylprop-1-yl), sec-butyl (2-butyl), t-butyl (1,1-dimethylethyl-1-yl), 2-pentyl, 3-pentyl, 2-methylbut-1-yl, isopentyl (3-methylbut-1-yl), 1,2-dimethylprop-1-yl, 1,1-dimethylprop-1-yl, neopentyl (2,2-dimethylprop-1-yl), 2-hexyl, 3-hexyl, 2-methylpent-1-yl, 3-methylpent-1-yl, isohexyl (4-methylpent-1-yl), 1,1-dimethylbut-1-yl, 1,2-dimethylbut-1-yl, 2,2-dimethylbut-1-yl, 2,3-dimethylbut-1-yl, 3,3-dimethylbut-1-yl, 1,1,2-trimethylprop-1-yl, and 1,2,2-trimethylprop-1-yl groups, isoheptyl, isooctyl, and the numerous other branched alkyl groups having up to 20 carbon atoms, wherein the "1-yl" suffix represents the point of attachment of the group.

In a third set of embodiments, the hydrocarbon group (R) is saturated and cyclic, i.e., a cycloalkyl group. Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane).

In a fourth set of embodiments, the hydrocarbon group (R) is unsaturated and straight-chained, i.e., a straight-chained (linear) olefinic or alkenyl group. The unsaturation occurs by the presence of one or more carbon-carbon double bonds and/or one or more carbon-carbon triple bonds. Some examples of straight-chained olefinic groups include vinyl, propen-1-yl (allyl), 3-buten-1-yl ($CH_2=CH—CH_2—CH_2—$), 2-buten-1-yl ($CH_2—CH=CH—CH_2—$), butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, propargyl (2-propynyl), 3-butynyl, and the numerous other straight-chained alkenyl or alkynyl groups having up to 20 carbon atoms.

In a fifth set of embodiments, the hydrocarbon group (R) is unsaturated and branched, i.e., a branched olefinic or alkenyl group. Some examples of branched olefinic groups include propen-2-yl ($CH_2=C.—CH_3$), 1-buten-2-yl ($CH_2=C.—CH_2—CH_3$), 1-buten-3-yl ($CH_2=CH—CH.—CH_3$), 1-propen-2-methyl-3-yl ($CH_2=C(CH_3)—CH_2—$), 1-penten-4-yl, 1-penten-3-yl, 1-penten-2-yl, 2-penten-2-yl, 2-penten-3-yl, 2-penten-4-yl, and 1,4-pentadien-3-yl, and the numerous other branched alkenyl groups having up to 20 carbon atoms, wherein the dot in any of the foregoing groups indicates a point of attachment.

In a sixth set of embodiments, the hydrocarbon group (R) is unsaturated and cyclic, i.e., a cycloalkenyl group. The unsaturated cyclic group can be aromatic or aliphatic. Some examples of unsaturated cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group may or may not also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene fused ring systems.

In some embodiments, any of the generic substituents described below may independently exclude any one or more of the classes, subclasses, or particular hydrocarbon groups described above, or may independently include only specific hydrocarbon groups selected from the hydrocarbon groups (R) described above.

In one aspect, the invention is directed to ionic liquids (ILs) useful as a lubricant additive or lubricant itself, wherein the ionic liquid contains a quaternary ammonium or phosphonium cation ionically bound to a phosphorus-containing or carboxylate anion. In the case of a phosphonium IL, the phosphonium cation contains four hydrocarbon groups bound to a central phosphorus atom. In the case of an ammonium IL, the ammonium cation contains four groups independently selected from hydrogen atoms and hydrocarbon groups, bound to a central nitrogen atom. In some embodiments, two hydrocarbon groups in the ammonium or phosphonium cation may interconnect to form a saturated or unsaturated cyclic group that includes the nitrogen or phosphorus atom as a ring heteroatom. For purposes of the invention, the hydrocarbon groups bound to the nitrogen or phosphorus atom contain no more than four carbon atoms. The ammonium or phosphonium cation may be symmetric or asymmetric. The term "symmetric", as used herein, corresponds to all hydrocarbon groups on the nitrogen or phosphorus atom being the same. Conversely, the term "asymmetric" corresponds to at least two hydrocarbon groups on the nitrogen or phosphorus atom being different.

As understood in the art, the term "ionic liquid compound" or "ionic liquid" refers to an ionic compound that is, itself, a liquid, i.e., without being dissolved in or solvated with a solvent. The ionic liquid is typically a liquid at room temperature (e.g., 15, 18, 20, 22, 25, or 30° C.) or lower. However, in some embodiments, the ionic liquid may become a liquid at a temperature above 30° C. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C. As used herein, the term "about" generally indicates within ±0.5%, 1%, 2%, 5%, or up to ±10% of the indicated value. For example, the term "about 100° C." generally indicates, in its broadest sense, 100° C.±10%, which indicates 90-110° C. The term "about" may alternatively indicate a variation or average in a physical characteristic of a group.

The density of the ionic liquid is typically in the range of 0.6-1.6 g/mL at an operating temperature of interest, and particularly at a temperature within 20-40° C. The viscosity of the ionic liquid is typically no more than 50,000 centipoise (50,000 cP) at an operating temperature of interest, and particularly at a temperature within 20-40° C. In different embodiments, the viscosity of the ionic liquid may be about, up to, less than, at least, or above, for example, 50, 100, 200, 300, 400, 500, 600, 700, 800, 900, 1000, 2000, 5000, 10,000, 15,000, 20,000, or 25,000 cP, or a viscosity within a range bounded by any two of these values.

The ionic liquids considered herein can be more specifically defined by the following generic structure:

(1)

In Formula (1), Z is either N or P. When Z is N, the ionic liquid is an ammonium ionic liquid. When Z is P, the ionic liquid is a phosphonium ionic liquid. The groups $R^1$, $R^2$, $R^3$, and $R^4$ are each independently selected from hydrogen atom and hydrocarbon groups (R) having one to four carbon atoms, provided that all of $R^1$, $R^2$, $R^3$, and $R^4$ are hydrocarbon groups when Z is P. In other embodiments, $R^1$, $R^2$, $R^3$, and $R^4$ are each independently selected from hydrogen atom and hydrocarbon groups (R) having one to three carbon atoms. In other embodiments, $R^1$, $R^2$, $R^3$, and $R^4$ are each independently selected from hydrogen atom and hydrocarbon groups (R) having one or two carbon atoms. In other embodiments, $R^1$, $R^2$, $R^3$, and $R^4$ are each independently selected from hydrogen atom and hydrocarbon groups (R) having three or four carbon atoms. In further embodiments of any of the above, groups $R^1$, $R^2$, $R^3$, and $R^4$ may be further limited by requiring that the sum of carbon atoms in $R^1$, $R^2$, $R^3$, and $R^4$ is no more than or less than 12, 10, 8, or 6 carbon atoms.

In one set of embodiments of Formula (1), the ionic liquid is an ammonium ionic liquid (i.e., where Z=N) according to the following generic formula:

(1a)

In Formula (1a), $R^{1a}$, $R^{2a}$, $R^{3a}$, and $R^{4a}$ are each independently selected from hydrogen atom and hydrocarbon groups containing one to four carbon atoms, wherein one or more of the hydrocarbon groups may or may not be (i.e., are optionally) substituted with one or more fluorine atoms. The hydrocarbon groups containing one to four carbon atoms can be any of the straight-chained or branched, saturated or unsaturated, cyclic or acyclic hydrocarbon groups (R) described earlier above containing one to four carbon atoms. In particular embodiments, $R^{1a}$, $R^{2a}$, $R^{3a}$, and $R^{4a}$ are each independently selected from hydrogen atom and straight-chained or branched alkyl and/or alkenyl groups containing one to four (or more specifically, two to four, one to three, one to two, or two to three) carbon atoms. Some particular examples of hydrocarbon groups containing one to four carbon atoms include methyl, ethyl, n-propyl, isopropyl, n-butyl, sec-butyl, isobutyl, t-butyl, vinyl, allyl, 2-buten-1-yl, propargyl, cyclopropyl, and cyclobutyl groups. As indicated earlier above, the hydrocarbon groups may also contain one or more fluorine atoms. Some examples of fluorinated hydrocarbon groups containing one to four carbon atoms include fluoromethyl, difluoromethyl, trifluoromethyl, 1,1-difluoroethyl, 2,2,2-trifluoroethyl, perfluoroethyl, perfluoro-n-propyl, perfluoroisopropyl, and perfluoro-n-butyl groups.

In a first embodiment, all of $R^{1a}$, $R^{2a}$, $R^{3a}$, and $R^{4a}$ in Formula (1a) are hydrogen atoms, which results in an unsubstituted ammonium ($NH_4^+$) cation. The unsubstituted ammonium cation may be ionically associated with a phosphorus-containing or carboxylate anion as discussed above and as discussed in further detail below.

In a second embodiment, one of $R^{1a}$, $R^{2a}$, $R^{3a}$, and $R^{4a}$ in Formula (1a) is a hydrocarbon group (or more particularly, alkyl or alkenyl group) containing one to four carbon atoms, with the remaining $R^{1a}$, $R^{2a}$, $R^{3a}$, and $R^{4a}$ groups being hydrogen atoms. Some examples of mono-substituted cations according to Formula (1a) in which one of $R^{1a}$, $R^{2a}$, $R^{1a}$, and $R^{4a}$ is a hydrocarbon group containing one to four carbon atoms include methylammonium (i.e., $(CH_3)NH_3^+$), ethylammonium, n-propylammonium, isopropylammonium, n-butylammonium, sec-butylammonium, isobutylammonium, t-butylammonium, vinylammonium, allylammonium, cyclopropylammonium, and cyclobutylammonium. Any of the foregoing mono-substituted ammonium cations may be ionically associated with (i.e., bound to) a phosphorus-containing or carboxylate anion as discussed above and as discussed in further detail below.

In a third embodiment, two of $R^{1a}$, $R^{2a}$, $R^{3a}$, and $R^{4a}$ in Formula (1a) are independently hydrocarbon groups (or more particularly, alkyl or alkenyl groups) containing one to four carbon atoms, with the remaining $R^{1a}$, $R^{2a}$, $R^{3a}$, and $R^{4a}$ groups being hydrogen atoms. Some examples of di-substituted ammonium cations according to Formula (1a) in which two of $R^{1a}$, $R^{2a}$, $R^{3a}$, and $R^{4a}$ are independently hydrocarbon groups containing one to four carbon atoms include dimethylammonium (i.e., $(CH_3)_2NH_2^+$), diethylammonium, methylethylammonium, di(n-propyl)ammonium, methyl(n-propyl)ammonium, ethyl(n-propyl)ammonium, diisopropylammonium, isopropyl(methyl)ammonium, ethyl(isopropyl)ammonium, n-propyl(isopropyl)ammonium, di(n-butyl)ammonium, n-butyl(methyl)ammonium, n-butyl(ethyl)ammonium, n-butyl(n-propyl)ammonium, n-butyl(isopropyl)ammonium, n-butyl(isobutyl)ammonium, di(sec-butyl)ammonium, sec-butyl(methyl)ammonium, diisobutylammonium, isobutyl(methyl)ammonium, di(t-butyl)ammonium, t-butyl(methyl)ammonium, divinylammonium, methyl(vinyl)ammonium, diallylammonium, allyl(methyl)ammonium, cyclopropyl(methyl)ammonium, and cyclobutyl(methyl)ammonium. Any of the foregoing di-substituted ammonium cations may be ionically associated with (i.e., bound to) a phosphorus-containing or carboxylate anion as discussed above and as discussed in further detail below.

In a fourth embodiment, three of $R^{1a}$, $R^{2a}$, $R^{3a}$, and $R^{4a}$ in Formula (1a) are independently hydrocarbon groups (or more particularly, alkyl or alkenyl groups) containing one to four carbon atoms, with the remaining $R^{1a}$, $R^{2a}$, $R^{3a}$, and $R^{4a}$ group being a hydrogen atom. Some examples of tri-substituted (i.e., tertiary) ammonium cations according to Formula (1a) in which three of $R^{1a}$, $R^{2a}$, $R^{3a}$, and $R^{4a}$ are independently hydrocarbon groups containing one to four carbon atoms include trimethylammonium (i.e., $(CH_3)_3NH^+$), ethyldimethylammonium, diethylmethylammonium, triethylammonium, tri(n-propyl)ammonium, methyl-di(n-propyl)ammonium, ethyl-di(n-propyl)ammonium, triisopropylammonium, methyl(diisopropyl)ammonium, ethyl(diisopropyl)ammonium, tri(n-butyl)ammonium, n-butyl(dimethyl)ammonium, n-butyl(diethyl)ammonium, n-butyl-di(n-propyl)ammonium, n-butyl(diisopropyl)ammonium, di(n-butyl)isobutylammonium, tri(sec-butyl)ammonium, sec-butyl(dimethyl)ammonium, triisobutylammonium, isobutyl(dimethyl)ammonium, tri(t-butyl)ammonium, t-butyl(dimethyl)ammonium, trivinylammonium, methyl(divinyl)ammonium, triallylammonium, allyl(dimethyl)ammonium, cyclopropyl(dimethyl)ammonium, and cyclobutyl(dimethyl)ammonium. Any of the foregoing tri-substituted ammonium cations may be ionically associated with (i.e., bound to) a phosphorus-containing or carboxylate anion as discussed above and as discussed in further detail below.

In a fifth embodiment, all of $R^{1a}$, $R^{2a}$, $R^{3a}$ and $R^{4a}$ in Formula (1a) are independently hydrocarbon groups (or more particularly, alkyl or alkenyl groups) containing one to four carbon atoms, thus resulting in an aprotic ammonium cation. Some examples of tetra-substituted (i.e., quaternary) ammonium cations according to Formula (1a) include tetramethylammonium (i.e., $(CH_3)_4N^+$), tetraethylammonium, tetra(n-propyl)ammonium, tetraisopropylammonium, tetra(n-butyl)ammonium, tetra(sec-butyl)ammonium, tetraisobutylammonium, tetravinylammonium, tetraallylammonium, diethyldimethylammonium, ethyltrimethylammonium, triethyl(methyl)ammonium, methyl-tri(n-propyl)ammonium, ethyl-tri(n-propyl)ammonium, dimethyl(diisopropyl)ammonium, trimethyl(isopropyl)ammonium, methyl(triisopropyl)ammonium, diethyl(diisopropyl)ammonium, methyl-tri(n-butyl)ammonium, ethyl-tri(n-butyl)ammonium, di(n-butyl)(dimethyl)ammonium, di(n-butyl)(diethyl)ammonium, di(n-butyl)di(n-propyl)ammonium, di(n-butyl)(diisopropyl)ammonium, di(n-butyl)

diisobutylammonium, di(sec-butyl)(dimethyl)ammonium, diisobutyl(dimethyl)ammonium, tri(t-butyl)methylammonium, di(t-butyl)(dimethyl)ammonium, dimethyl(divinyl)ammonium, vinyltrimethylammonium, diallyl(dimethyl)ammonium, allyltrimethylammonium, cyclopropyl(trimethyl)ammonium, and cyclobutyl(trimethyl)ammonium. Any of the foregoing quaternary ammonium cations may be ionically associated with (i.e., bound to) a phosphorus-containing or carboxylate anion as discussed above and as discussed in further detail below.

In another set of embodiments of Formula (1), the ionic liquid is a phosphonium ionic liquid (i.e., where Z=P) according to the following generic formula:

(1b)

In Formula (1b), $R^{1b}$, $R^{2b}$, $R^{3b}$, and $R^{4b}$ are each independently selected from hydrocarbon groups containing one to four carbon atoms, wherein one or more of the hydrocarbon groups may or may not be (i.e., are optionally) substituted with one or more fluorine atoms. The hydrocarbon groups containing one to four carbon atoms can be any of the straight-chained or branched, saturated or unsaturated, cyclic or acyclic hydrocarbon groups (R) described earlier above containing one to four carbon atoms. In particular embodiments, $R^{1b}$, $R^{2b}$, $R^{3b}$, and $R^{4b}$ are each independently selected from straight-chained or branched alkyl and/or alkenyl groups containing one to four (or more specifically, two to four, one to three, one to two, or two to three) carbon atoms. Some particular examples of hydrocarbon groups containing one to four carbon atoms include methyl, ethyl, n-propyl, isopropyl, n-butyl, sec-butyl, isobutyl, t-butyl, vinyl, allyl, 2-buten-1-yl, propargyl, cyclopropyl, and cyclobutyl groups. As indicated earlier above, the hydrocarbon groups may also contain one or more fluorine atoms. Some examples of fluorinated hydrocarbon groups are provided under Formula (1a) above.

Some examples of phosphonium cations according to Formula (1b) include tetramethylphosphonium (i.e., $(CH_3)_4P^+$), tetraethylphosphonium, tetra(n-propyl)phosphonium, tetraisopropylphosphonium, tetra(n-butyl)phosphonium, tetra(sec-butyl)phosphonium, tetraisobutylphosphonium, tetravinylphosphonium, tetraallylphosphonium, diethyldimethylphosphonium, ethyltrimethylphosphonium, triethyl(methyl)phosphonium, methyl-tri(n-propyl)phosphonium, ethyl-tri(n-propyl)phosphonium, dimethyl(diisopropyl)phosphonium, trimethyl(isopropyl)phosphonium, methyl(triisopropyl)phosphonium, diethyl(diisopropyl)phosphonium, methyl-tri(n-butyl)phosphonium, ethyl-tri(n-butyl)phosphonium, di(n-butyl)(dimethyl)phosphonium, di(n-butyl)(diethyl)phosphonium, di(n-butyl)di(n-propyl)phosphonium, di(n-butyl)(diisopropyl)phosphonium, di(n-butyl)diisobutylphosphonium, di(sec-butyl)(dimethyl)phosphonium, diisobutyl(dimethyl)phosphonium, tri(t-butyl)methylphosphonium, di(t-butyl)(dimethyl)phosphonium, dimethyl(divinyl)phosphonium, vinyltrimethylphosphonium, diallyl(dimethyl)phosphonium, allyltrimethylphosphonium, cyclopropyl(trimethyl)phosphonium, and cyclobutyl(trimethyl)phosphonium. Any of the foregoing quaternary phosphonium cations may be ionically associated with (i.e., bound to) a phosphorus-containing or carboxylate anion as discussed above and as discussed in further detail below.

In some embodiments, two hydrocarbon groups selected from $R^1$, $R^2$, $R^3$, and $R^4$ in Formula (1) may (i.e., optionally) interconnect to form a cyclic group that includes Z as a ring heteroatom. As an example, if $R^1$ and $R^2$ are taken as ethyl groups, $R^1$ and $R^2$ may interconnect to form a five-membered ring that includes Z. In the more specific case of Formula (1a), two of $R^{1a}$, $R^{2a}$, $R^{3a}$, and $R^{4a}$ in Formula (1a) may (i.e., optionally) be interconnected to form a cyclic group that includes N as a ring heteroatom, thereby forming a cyclic ammonium group. In the more specific case of Formula (1b), two of $R^{1b}$, $R^{2b}$, $R^{3b}$, and $R^{4b}$ in Formula (1b) may (i.e., optionally) be interconnected to form a cyclic group that includes P as a ring heteroatom, thereby forming a cyclic phosphonium group. The formed ring is typically a five-membered or six-membered ring, although smaller or large ring sizes are possible (e.g., four- or seven-membered rings). The ring formed on Z may be saturated or unsaturated. Unsaturation in the ring, if present, results from unsaturation in one of the hydrocarbon groups forming the ring. The ring may or may not also include an additional ring heteroatom or heteroatom group (e.g., —O—, —NH—, =N—, or —S—) inserted between ring carbon atoms, i.e., aside from the Z heteroatom in Formula (1).

Some examples of cations of Formula (1) containing rings formed by interconnection of two R groups are shown below:

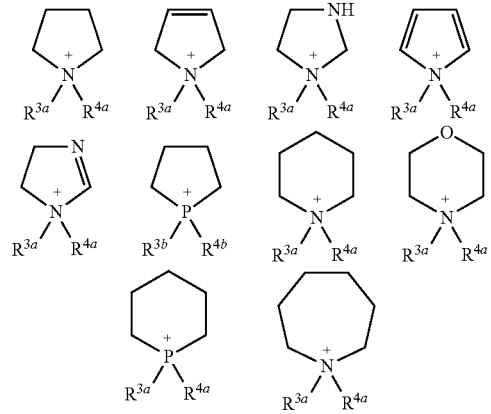

Some more specific examples of cations of Formula (1) containing rings formed by interconnection of two R groups include N-Methyl-Pyrrolidinium (NMP), N-Methyl-Piperidinium (NMPPR), N-Methyl-Morpholinium (NMM), and Morpholinium (Mor), all of which are depicted in FIG. 1.

In another embodiment of Formula (1), two hydrocarbon groups selected from $R^1$-$R^4$ are interconnected along with a third group selected from $R^1$-$R^4$ in order to form an unsaturated ring that specifically includes an unsaturated carbon-Z bond; i.e., where the third group selected from $R^1$-$R^4$ is removed to permit formation of the unsaturated carbon-Z bond in the ring. Some examples of cations of Formula (1) containing unsaturated rings formed by interconnection of three $R^1$-$R^4$ groups are shown below:

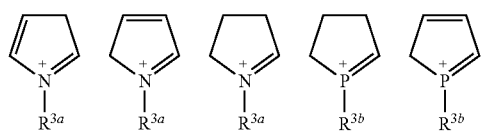

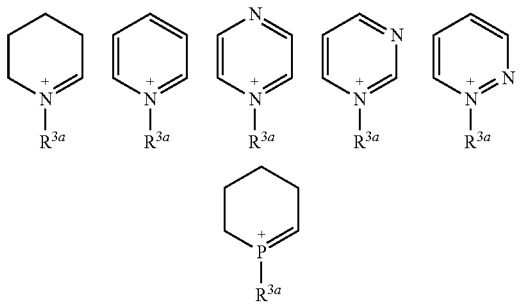

In one set of embodiments, the counteranion ($X^-$) of the ionic liquid is a phosphorus-containing anion having the following generic formula:

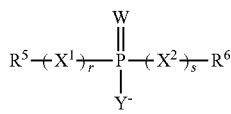

(2)

In Formula (2), $R^5$ and $R^6$ are independently selected from any of the hydrocarbon groups (R), described above, having one to four carbon atoms, wherein the hydrocarbon groups are optionally substituted with one or more fluorine atoms. The groups $X^1$, $X^2$, W, and Y are independently selected from O and S atoms, and the subscripts r and s are independently selected from 0 and 1. In particular embodiments, $R^5$ and $R^6$ are each independently selected from straight-chained or branched alkyl and/or alkenyl groups containing one to four (or more specifically, two to four, one to three, one to two, or two to three) carbon atoms. Some particular examples of hydrocarbon groups containing one to four carbon atoms include methyl, ethyl, n-propyl, isopropyl, n-butyl, sec-butyl, isobutyl, t-butyl, vinyl, allyl, 2-buten-1-yl, propargyl, cyclopropyl, and cyclobutyl groups. As indicated earlier above, the hydrocarbon groups may also contain one or more fluorine atoms. Some examples of fluorinated hydrocarbon groups are provided under Formula (1a) above. In some embodiments, the anion according to Formula (2) is symmetric, while in other embodiments, the anion according to Formula (2) is asymmetric. Moreover, $R^5$ and $R^6$ can optionally be interconnected to form a cyclic structure.

In one set of embodiments of Formula (2), all of $X^1$, $X^2$, W, and Y are oxygen atoms, which corresponds to the following sub-formula:

(2-1)

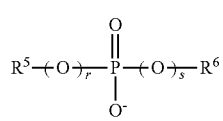

In a separate set of embodiments of Formula (2), subscripts r and s are both 1, which corresponds to the following sub-formula:

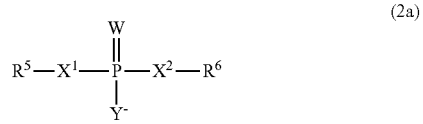

(2a)

In one set of embodiments of Formula (2a), all of $X^1$, $X^2$, W, and Y are oxygen atoms, which corresponds to the following sub-formula (i.e., phosphate diester):

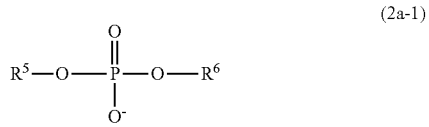

(2a-1)

In another set of embodiments of Formula (2a), one of $X^1$, $X^2$, W, and Y is a sulfur atom. Generally, the single sulfur atom is at group W, which corresponds to the following sub-formula (i.e., thiophosphate diester):

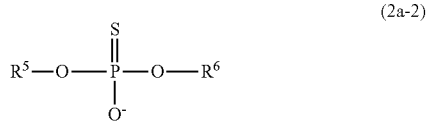

(2a-2)

In another set of embodiments of Formula (2a), two of $X^1$, $X^2$, W, and Y are sulfur atoms. Generally, the two sulfur atoms are at groups W and Y, which corresponds to the following sub-formula (i.e., dithiophosphate diester):

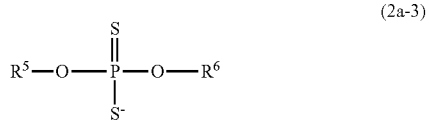

(2a-3)

In the above formula, one or two of the remaining oxygen atoms may be replaced with sulfur atoms to result in a trithiophosphate or tetrathiophosphate species, respectively.

In a separate set of embodiments of Formula (2), one of subscripts r and s is 0 (e.g., r is 1 and s is 0), which corresponds to the following sub-formula:

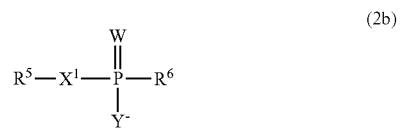

(2b)

In one set of embodiments of Formula (2b), all of $X^1$, W, and Y are oxygen atoms, which corresponds to the following sub-formula (i.e., phosphonate ester):

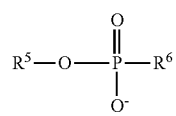 (2b-1)

In another set of embodiments of Formula (2b), one of $X^1$, W, and Y is a sulfur atom. Generally, the single sulfur atom is at group W, which corresponds to the following sub-formula (i.e., thiophosphonate ester):

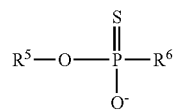 (2b-2)

In another set of embodiments of Formula (2b), two of $X^1$, W, and Y are sulfur atoms. Generally, the two sulfur atoms are at groups W and Y, which corresponds to the following sub-formula (i.e., dithiophosphonate ester):

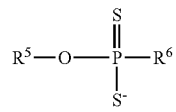 (2b-3)

In the above formula, the remaining oxygen atom may be replaced with a sulfur atom to result in a trithiophosphonate species.

In a separate set of embodiments of Formula (2), both subscripts r and s are 0, which corresponds to the following sub-formula:

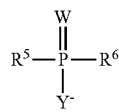 (2c)

In one set of embodiments of Formula (2c), both of W and Y are oxygen atoms, which corresponds to the following sub-formula (i.e., phosphinate):

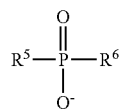 (2c-1)

In another set of embodiments of Formula (2c), one of W and Y is a sulfur atom. Generally, the single sulfur atom is at group W, which corresponds to the following sub-formula (i.e., thiophosphinate):

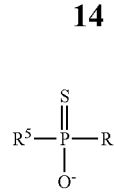 (2c-2)

In another set of embodiments of Formula (2c), both W and Y are sulfur atoms, which corresponds to the following sub-formula (i.e., dithiophosphinate):

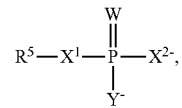 (2c-3)

In yet other embodiments of Formula (2) or any of its sub-formulas, r and s are both 1 (i.e., $X^1$ and $X^2$ are both present), but one of $R^5$ or $R^6$ may be absent, which results in a divalent anion. The divalent anion can be depicted, for example, as follows:

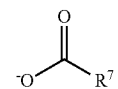

or in exemplary sub-embodiments thereof:

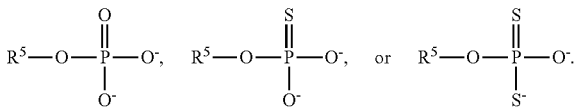

In another set of embodiments, the counteranion ($X^-$) of the ionic liquid is a carboxylate anion having the following generic formula:

(3)

In Formula (3), $R^7$ is a hydrocarbon group containing 1-20 carbon atoms, which may be selected from any of the hydrocarbon groups (R) described above. In different embodiments, $R^7$ may contain 1-20, 1-18, 1-16, 1-14, 1-12, 1-10, 1-8, 1-6, 1-4, 1-3, 3-20, 3-18, 3-16, 3-14, 3-12, 3-10, 3-8, 3-6, 4-20, 4-18, 4-16, 4-14, 4-12, 4-10, 4-8, 4-6, 6-20, 6-18, 6-16, 6-14, 6-12, 6-10, or 6-8 carbon atoms. In some embodiments, $R^7$ is a straight-chained or branched alkyl or alkenyl group containing 1-20 carbon atoms or a number of carbon atoms within any of the foregoing exemplary sub-ranges.

In a first set of embodiments, the ionic liquid is composed of an ammonium cation according to Formula (1a) or any of its sub-formulas in combination with a phosphorus-containing anion according to Formula (2) or any of its sub-formulas. In a second set of embodiments, the ionic liquid is composed of an ammonium cation according to Formula (1a) or any of its sub-formulas in combination with a carboxylate anion according to Formula (3). In a third set of embodiments, the ionic liquid is composed of a phosphonium cation according to Formula (1b) or any of its sub-formulas in combination with a phosphorus-containing anion according to Formula (2) or any of its sub-formulas. In a second set of embodiments, the ionic liquid is composed of a phosphonium cation according to Formula (1b) or any of its sub-formulas in combination with a carboxylate anion according to Formula (3).

The ionic liquids described above can be synthesized by methodologies well known in the art. The methodologies typically involve salt-forming exchange between cationic- and anionic-containing precursor compounds. For example, an ammonium or phosphonium halide compound of the formula $[ZR^1R^2R^3R^4]^+[X']^-$ (where Z=N or P and the halide X' is typically chloride, bromide, or iodide) can be reacted with the acid or salt form of any of the phosphorus-containing or carboxylate anions described above to form an ionic liquid according to Formula (1) above, with concomitant liberation of the corresponding hydrogen halide or halide salt. Such methods are described, for example, in J. Qu, et al., Applied Materials and Interfaces, 4, pp. 997-1002, 2012, which is herein incorporated by reference in its entirety. In the specific case of tertiary or secondary ammonium ionic liquids, these may be prepared by reacting a neutral amine (e.g., $NR^1R^2R^3$) with an acid form of any of the phosphorus-containing or carboxylate anions (acid form indicated as HX) described above to form the $[NR^1R^2R^3H^+][X^-]$ ionic liquid.

In another aspect, the invention is directed to a lubricant composition that includes one or more of the ionic liquids described above dissolved in a base lubricant. The term "dissolved", as used herein, indicates complete dissolution of the ionic liquid in the base lubricant, i.e., the ionic liquid is completely miscible in the base lubricant. In different embodiments, the ionic liquid is dissolved in the base lubricant in an amount of at least 0.1, 0.5, 1, 2, 3, 4, 5, 10, 15, 20, 25, 30, 35, 40, 45, 50, 55, 60, 65, 70, 75, 80, 85, or 90 wt % (i.e., weight of ionic liquid by weight of the total of ionic liquid and base lubricant) or dissolved in the base lubricant within a range bounded by any two of the foregoing values. In some embodiments, the ionic liquid possesses complete solubility in the base lubricant when included in the base lubricant in an amount of, for example, at least 0.1, 0.5, 1, 2, 5, 10, 12, 15, 20, 30, 40, or 50 wt % by weight of the lubricant composition, or an amount within a range bounded by any two of the foregoing values. Generally, the ionic liquid in the lubricant composition is one, two, or more selected from any of the ionic liquids herein described. To preserve the eco-friendly characteristic of the lubricant composition, the lubricant composition may exclude ionic liquids not within the scope of the above described ionic liquids as set forth in Formulas (1), (1a), and (1b).

In some embodiments, the lubricant composition having any of the above concentrations of ionic liquids is used directly as a lubricant without diluting in additional oil or organic solvent. In other embodiments, the lubricant composition having any of the above concentrations of ionic liquid is diluted before use. Thus, any of the above-described lubricant compositions having any of the above concentrations of ionic liquid (particularly those of higher concentration, e.g., at least 10, 20, 30, 40, or 50 wt %) may be stored as a commodity, and optionally diluted, prior to use. Prior to or during use as a lubricant, the lubricant composition more typically includes the ionic liquid in an amount of, for example, 0.1, 0.2, 0.5, 1, 2, 3, 4, or 5 wt %, or within a range bounded by any two of the foregoing values, e.g., 0.1-5 wt %, 0.1-4 wt %, 0.1-3 wt %, 0.1-2 wt %, 0.1-1 wt %, 0.2-5 wt %, 0.2-4 wt %, 0.2-3 wt %, 0.2-2 wt %, 0.2-1 wt %, 0.5-5 wt %, 0.5-4 wt %, 0.5-3 wt %, 0.5-2 wt %, or 0.5-1 wt %.

The base lubricant can be any of the polar or non-polar base lubricants known in the art useful as mechanical lubricating oils. As well known in the art, the mechanical lubricating oil can be further classified as, for example, an engine (motor) lubricating oil, industrial lubricating oil, or metal working fluid. The classification, uses, and properties of such oils are well known in the art, as provided, for example, by U.S. Pat. No. 8,268,760, the contents of which are herein incorporated by reference in their entirety. In particular, the base lubricant may belong to any of the well established five categories of hydrocarbon oils (i.e., Groups I, II, III, IV, or V) classified according to the extent of saturates, sulfur, and viscosity index. The base lubricant can have any of the typical boiling points, e.g., at least 100, 120, 150, 180, or 200° C. and up to 250, 300, 350, 400, 450, or 500° C.

For purposes of the present invention, the base lubricant is preferably a more ecofriendly type of base lubricant. Some examples of more ecofriendly base lubricants include polyalkylene glycols (PAGs), vegetable oils, synthetic ester oils, polyalphaolefins (PAOs), and water. All of the foregoing ecofriendly lubricants are well known in the art, as evidenced in, for example, P. Nagendramma et al., *Renewable and Sustainable Energy Reviews*, 16, 764-774 (2012); J. Burton, Lubes'n'Greases, 22(9), September 2016; and United States Environmental Protection Agency, Office of Wastewater Management, EPA 800-R-11-002, Washington, D.C. 20460, November 2011, the contents of which are herein incorporated by reference. In some embodiments, the base lubricant may have a substantially high enough viscosity to qualify it as a grease, wherein the grease typically lowers in viscosity during use by virtue of heat generated during use.

In one set of embodiments, the base lubricant is a PAG. PAGs are very well known in the art. The PAG may have the formula, for example, $R^aO-(CHR^bCHR^cO)_nH$, wherein $R^a$, $R^b$, and $R^c$ are independently selected from hydrocarbon groups (R) and hydrogen atoms, wherein the hydrocarbon groups in PAGs, if present, typically have 1-3 carbon atoms and are more typically alkyl groups (e.g., methyl, ethyl, or n-propyl). The value of n is typical of a polymer, e.g., at least 10, 20, 30, 40, or 50. PAGs containing $R^a$ as hydrogen, methyl, or ethyl and $R^b$ and $R^c$ as hydrogen atoms are generally water-soluble. PAGs containing $R^b$ and/or $R^c$ as a hydrocarbon group (e.g., methyl or ethyl) are generally less water-soluble and more oil-soluble.

In another set of embodiments, the base lubricant is a vegetable oil. The vegetable oil may be natural or chemically modified and may be a triglyceride, diglyceride, or monoglyceride, or mixture thereof. The fatty acid chains in the vegetable oil may be saturated or unsaturated, although saturated fatty acid chains are generally preferred due to the potential for unsaturated fatty acids to oxidize. Some examples of vegetable oils useful as lubricants include rapeseed, canola, soybean, sunflower, safflower, palm, palm kernel, castor, olive, peanut, corn, cottonseed, and linseed oils.

In another set of embodiments, the base lubricant is a synthetic ester oil. As well known in the art, synthetic ester oils may be or include, for example, dibasic acid esters and/or polyol esters. The synthetic ester oil may be derived from, for example, diols, triols, tetrols, or polyols. Synthetic ester oils are well known in the art. Synthetic ester oils are described in detail in, for example, U.S. Pat. Nos. 2,798,083, 2,956,954, 3,205,173, 5,674,822, 5,885,946, 9,481,852, and 9,556,394, the contents of which are herein incorporated by reference.

In another set of embodiments, the base lubricant is a PAO. As well known in the art, PAOs may be produced from linear alpha olefins containing about 8-14 carbon atoms by an oligomerization process resulting in dimers, trimers, tetramers, and higher multiples of such olefins. PAOs are described in detail in, for example, U.S. Pat. Nos. 5,783,531, 6,071,863, and 7,476,645, the contents of which are herein incorporated by reference.

In another set of embodiments, the base lubricant is water, which may be pure water or water admixed with a water-soluble solvent (e.g., an alcohol). Generally, the water is not admixed with a salt compound other than one or more of the ionic liquids described herein.

The lubricant composition may or may not also include any one or more conventional lubricant additives well known in the art. The term "additive", as used herein, is understood to be a compound or material, or mixture of compounds or materials, that provides an adjunct or auxiliary effect at low concentrations, typically up to or less than 1, 2, 5, 7, or 10 wt % by weight of the lubricant composition. The additive can be, for example, an anti-wear additive (typically metal-containing), extreme pressure additive, metal chelator, ultraviolet stabilizer, radical scavenger, antioxidant, corrosion inhibitor, friction modifier, detergent, surfactant, anti-foaming agent, viscosity modifier (viscosity index improver), or anti-foaming agent, or combination thereof, all of which are well known in the art, as further described in U.S. Pat. Nos. 8,455,407 and 8,268,760, both of which are herein incorporated by reference in their entirety.

In some embodiments, the lubricant composition described may or may not include a non-ionic liquid (non-IL) additive, such as a metal-containing dithiophosphate, sulfur-containing fatty acid or ester thereof, dialkyl sulfide, dithiocarbamate, polysulfide, or boric acid ester. In further embodiments, the additive is a metal-containing dialkyldithiophosphate or dialkyldithiocarbamate, wherein the metal is typically zinc or molybdenum, as in zinc dialkyldithiophosphate (ZDDP) or molybdenum dialkyldithiocarbamate (MoDTC), and the alkyl groups typically include between 3 and 12 carbon atoms and can be linear or branched. The additive can be included in the lubricant composition in any suitable amount typically used in the art, such as between 1 and 15 wt %. In some embodiments, the additive is advantageously used in an amount less than typically used in the art, e.g., in an amount of less than 1 wt %, or up to or less than 0.5 or 0.1 wt %, by virtue of the improved properties provided by the instantly described ionic liquids or by a synergistic interaction between the instantly described ionic liquids and the non-IL additive. In some embodiments, any one or more of the above described conventional additives is excluded from the lubricant composition.

In one embodiment, the ionic liquid or the lubricating composition is not dissolved, admixed with, or otherwise in contact with a non-ionic liquid organic solvent (i.e., "solvent"). In other embodiments, the ionic liquid is dissolved in, or admixed with, or in contact with one or more organic solvents, either in the absence or presence of a base lubricant. If the ionic liquid is dissolved in a base lubricant, then the organic solvent should be completely soluble in the base lubricant. The organic solvent can be, for example, protic or non-protic and either polar or non-polar. Some examples of protic organic solvents include the alcohols, particularly those more hydrophobic than methanol or ethanol, such as n-propanol, isopropanol, n-butanol, sec-butanol, isobutanol, t-butanol, n-pentanol, isopentanol, 3-pentanol, neopentyl alcohol, n-hexanol, 2-hexanol, 3-hexanol, 3-methyl-1-pentanol, 3,3-dimethyl-1-butanol, isohexanol, and cyclohexanol. Some examples of polar aprotic solvents include ether (e.g., diethyl ether, 1,2-dimethoxyethane, 1,2-diethoxyethane, 1,3-dioxolane, and tetrahydrofuran), ester (e.g., 1,4-butyrolactone, ethylacetate, methylpropionate, and ethylpropionate), nitrile (e.g., acetonitrile, propionitrile, and butyronitrile), sulfoxide (e.g., dimethyl sulfoxide, ethyl methyl sulfoxide, diethyl sulfoxide, methyl propyl sulfoxide, and ethyl propyl sulfoxide), and amide solvents (e.g., N,N-dimethylformamide, N,N-diethylformamide, acetamide, and dimethylacetamide). Some examples of non-polar solvents include the liquid hydrocarbons, such as the pentanes, hexanes, heptanes, octanes, pentenes, hexenes, heptenes, octenes, benzene, toluene, and xylenes. In some embodiments, any of the above organic solvents (or organic solvents altogether) are excluded from the lubricant composition.

In another aspect, the invention is directed to methods for using the above-described ionic liquids, either autonomously (i.e., in the absence of a base lubricant) or within a lubricant composition, for reducing wear and/or reducing friction in a mechanical device for which lubricity is beneficial. The mechanical device may be, for example, a bearing (e.g., a slide bearing, ball bearing, rolling element bearing, or jewel bearing), piston, turbine fan, rotary blade, compressor blade, gear, axle, engine part (e.g., engine valve, piston, cylinder, or transmission), hydraulic system, or metal cutting tool or machine. The parts being lubricated are typically constructed of a metal or metal alloy, which may be or include, for example, steel, iron, aluminum, nickel, titanium, or magnesium, or a composite or alloy thereof. If used autonomously, the ionic liquid is not included in a base lubricant, but may be combined with any one or more of the additives described above if the ionic liquid and additive are miscible with each other. The ionic liquid or lubricant composition described above can be applied to a mechanical component by any means known in the art. For example, the component may be immersed in the ionic liquid compound, or a coating (film) of the ionic liquid compound may be applied to the component by, e.g., dipping, spraying, painting, or spin-coating.

In some embodiments, a single ionic liquid compound according to Formula (1) is used, while in other embodiments, a combination of two or more ionic liquid compounds according to Formula (1) is used. In a first embodiment, the combination of ionic liquid compounds corresponds to the presence of two or more cationic species according to Formulas (1a) and/or (1b) in the presence of a single anionic species of any of those described above in Formula (2) or (3). In a second embodiment, the combination of ionic liquid compounds corresponds to the presence of a single cationic species in the presence of two or more anionic species according to Formulas (2) and/or (3). In a third embodiment, the combination of ionic liquid compounds corresponds to the presence of two or more cationic species of any of those described above according to Formulas (1a) and/or (1b) in the presence of two or more anionic species according to Formulas (2) and/or (3).

The ionic liquids described above reduce wear and/or friction. In some embodiments, the ionic liquid or lubricating composition in which the IL is incorporated provides a coefficient of friction (i.e., friction coefficient) of up to or less than, for example, 0.5, 0.4, 0.3, 0.2, 0.1, or 0.05, or a reduction in friction by any of the foregoing values or by at least 10, 20, 30, 40, 50, 60, 70, 80, or 90%. In other embodiments, the ionic liquid or lubricating composition may or may not have an appreciable effect on friction, but may reduce the wear rate, e.g., by at least or greater than 10, 20, 30, 40, or 50%. In yet other embodiments, the ionic liquid or lubricating composition may or may not also improve the corrosion resistance of the treated substrate. The improved corrosion resistance may be evidenced by a resistance to corrosion in air or after treatment in a liquid corrosion test, such as treatment in a salt solution of at least 0.1 M, 0.2 M, 0.5 M, 1.0 M, 1.5 M, or 2.0 M concentration for at least 0.5, 1, 2, 3, 4, 5, 6, 12, 18, 24, 36, or 48 hours. In still other embodiments, the ionic liquids described herein may provide a multiplicity of functions, which can be two or more of, for example, anti-wear, extreme pressure, friction modifier, anti-oxidant, detergent, and anti-corrosion functions.

Examples have been set forth below for the purpose of illustration and to describe certain specific embodiments of the invention. However, the scope of this invention is not to be in any way limited by the examples set forth herein.

EXAMPLES

Synthesis of Exemplary Ionic Liquids

The structures of a number of investigated ionic liquids are provided in FIG. 1.

Tetraoctylphosphonium bis(2-ethylhexyl) phosphate ($[P_{8888}][DEHP]$) was synthesized via mixing an equal molar amount of tetraoctylphosphonium bromide ($P_{8888}Br$) and bis(2-ethylhexyl) phosphoric acid (HDEHP) in deionized water and hexane. This stirred suspension was added to a solution of sodium hydroxide dropwise at room temperature. The mixture continued to be stirred at room temperature overnight. The upper organic phase was separated and washed with deionized (DI) water four times to ensure removal of NaBr. Solvents were distilled off by rotary evaporator, and the product was dried at 70° C. under vacuum for 4 hours to yield $[P_{8888}][DEHP]$.

Trioctylammonium di(2-ethylhexyl)phosphate ($[N_{888}H][DEHP]$) was formed by neutralizing an equal molar amount of trioctylamine ($N_{888}$) and di(2-ethylhexyl)phosphoric acid (HDEHP) at room temperature for 2 hours. The mixture liquid became more viscous during stirring.

Triethylammonium di(butyl)phosphate ($[N_{222}H][DBP]$) was formed by neutralizing an equal molar amount of triethylamine ($N_{222}$) and di(butyl)phosphoric acid (HDBP) at room temperature for 2 hours. The mixture liquid became more viscous during stirring. Other protic ammonium phosphates used in this research work were synthesized via a similar procedure as $[N_{222}H][DBP]$, but using different amines instead of triethylamine.

Tetraoctylammonium octadecanoate ($[N_{8888}][C_{17}H_{35}COO]$) was synthesized by mixing the same molar amount of tetraoctylammonium bromide and stearic acid in hexane. A solution of NaOH was then added dropwise to this mixture at room temperature. The mixture was stirred at room temperature for two days. The upper organic phase was separated and washed four times with DI water. Product was dried at 70° C. under vacuum for 4 hours to yield $[N_{8888}][C_{17}H_{35}COO]$ as a viscous liquid.

Tetraoctylammonium tetradecanoate ($[N_{8888}][C_{17}H_{35}COO]$) was synthesized via a similar procedure as $[N_{8888}][C_{17}H_{35}COO]$, but using tetradecanoic instead of stearic acid.

The trioctylammonium salicylate ($[N_{888}H][C_7H_5O_3]$) was synthesized via a similar procedure as $[N_{888}H][DEHP]$, but using salicylic acid ($C_7H_6O_3$) instead of di(2-ethylhexyl) phosphoric acid.

Tributyl(ethyl)phosphonium diethyl phosphate ($[P4442][DEP]$) and tributyl(methyl)ammonium dibutyl phosphate ($[N4441][DBP]$) were obtained from commercial sources.

Incorporation of Ionic Liquids into Base Oils

Two base oils chosen for this study were Polyalkylene Glycol (PAG) and Oil Soluble PAG (OSP). The PAG and OSP molecular structures are illustrated in FIG. 1. The viscosities at 40° C. of these two polar base oils were measured using a PertroLab Minivis II viscometer to be 33.0 and 30.4 cSt, respectively, as shown in Table 1, below.

TABLE 1

Viscosity of the PAG and OSP base oils

| Oil | Measured viscosity (cSt) | | | |
|---|---|---|---|---|
|  | 100° C. | 82° C. | 40° C. | 23° C. |
| PAG (50-HB-170) | 7.1 | 10.2 | 33.0 | 67.0 |
| OSP-32 | 5.8 | 8.5 | 31 | 66.1 |

The solubility of ILs in the base oils was determined by centrifuging the oil-additive blends at 13,000 rpm for 5 min. As shown in Table 2 below, all candidate ILs have solubility more than 5 wt % in both PAG and OSP.

TABLE 2

Solubility of candidate ionic liquids in PAG and OSP base oils

| IL's solubility in base oil (wt. %) | PAG (50-HB-170) | OSP-32 | Note |
|---|---|---|---|
| $[P_{8888}][DEHP]$ | >5% | >5% | Previously designed for engine and gear lubrication |
| $[N_{888}H][DEHP]$ | >5% | >5% |  |
| $[P_{4442}][DEP]$ | >5% | >5% |  |
| $[N_{4441}][DBP]$ | >5% | >5% |  |
| $[N_{222}H][DBP]$ | >5% | >5% |  |
| $[N_{444}H][DBP]$ | >5% | >5% |  |
| $[N_{666}H][DBP]$ | >5% | >5% |  |
| $[N_{888}H][DBP]$ | >5% | >5% | Newly designed, potentially eco-friendly for hydraulic and hydropower fluids |
| [NMP][DBP] | >5% | >5% |  |
| [NMPPR][DBP] | >5% | >5% |  |
| [NMM][DBP] | >5% | >5% |  |
| [Mor][DBP] | >5% | >5% |  |
| $[N_{888}H][C_7H_5O_3]$ | >5% | >5% |  |
| $[N_{8888}][C_{13}H_{27}COO]$ | >5% | >5% |  |
| $[N_{8888}][C_{17}H_{35}COO]$ | >5% | >5% |  |

Since a typical treat rate of anti-wear additives, e.g., ZDDP, in hydraulic fluid is 0.5 wt %, this study used 0.5 wt % concentration for all candidate ILs and ZDDP in the PAG and OSP base oils for tribological testing and analysis. For aquatic toxicity testing, a ten times higher additive concentration, 5.0 wt %, was used.

A TGA-2950 (TA Instruments) was used to conduct thermogravimetric analysis (TGA) on selected ILs at a 10° C./min heating rate in air.

Toxicity Testing

Chronic ecotoxicity tests were conducted by exposing the freshwater crustacean *Ceriodaphnia dubia* to the selected ILs following standard EPA protocols. *Daphnia* is a model organism commonly used for toxicity testing because of its relatively short life span (<30 days), rapid reproduction rate, and high sensitivity to environmental conditions (Y.-R. Luo et al., *Environ. Toxicol.*, 23, 736-744, 2008; L. Guilhermino et al., *Ecotoxicol. Environ. Saf.*, 46, 357-362, 2000). The seven day tests began with laboratory bred, *Daphnia* neonates (n=10 per treatment, <24 hours old) all born within 8 hours of each other. Stock solutions of ILs and ZDDP were prepared to a concentration of 5 wt %. *Daphnia* were exposed to a 0.001% dilution (10 ppm) of each stock solution, with Dilute Mineral Water (DMW) for a final concentration of each compound of 0.5 ppm. Control *Daphnia* (n=10 per test) were exposed to DMW only. Each individual *Daphnia* was placed in 10 mL of treatment solution, kept in an incubator at a 12:12 light/dark cycle at 25.0° C. *Daphnia* were fed and observed daily, and survival and reproduction data were recorded and are reported with respect to control treatments for each test.

Figure 2A:
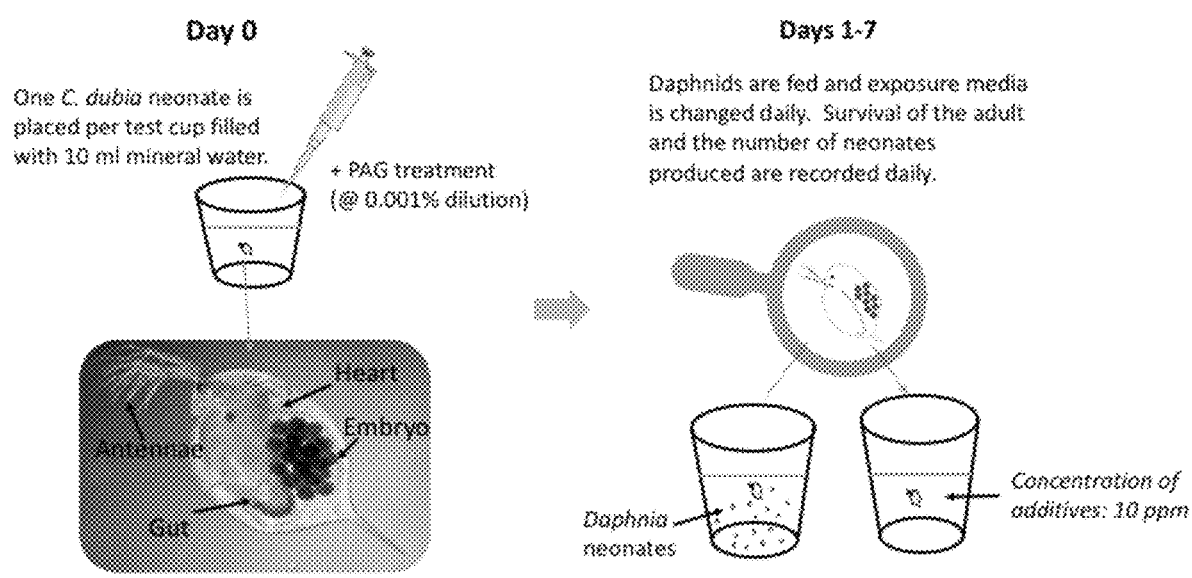
Figures 3A, 3B:
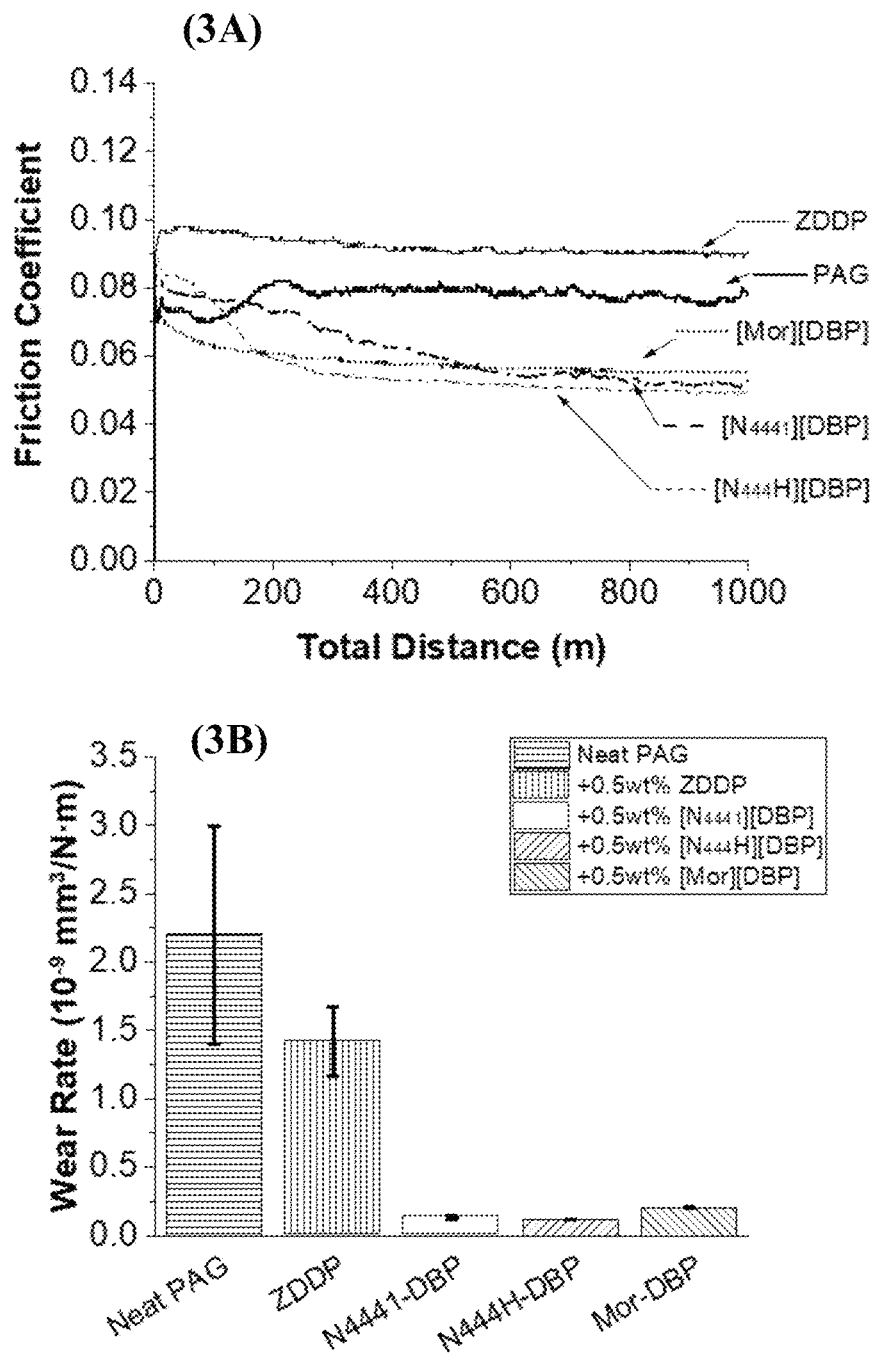
Figures 4A, 4B, 4C, 4D:
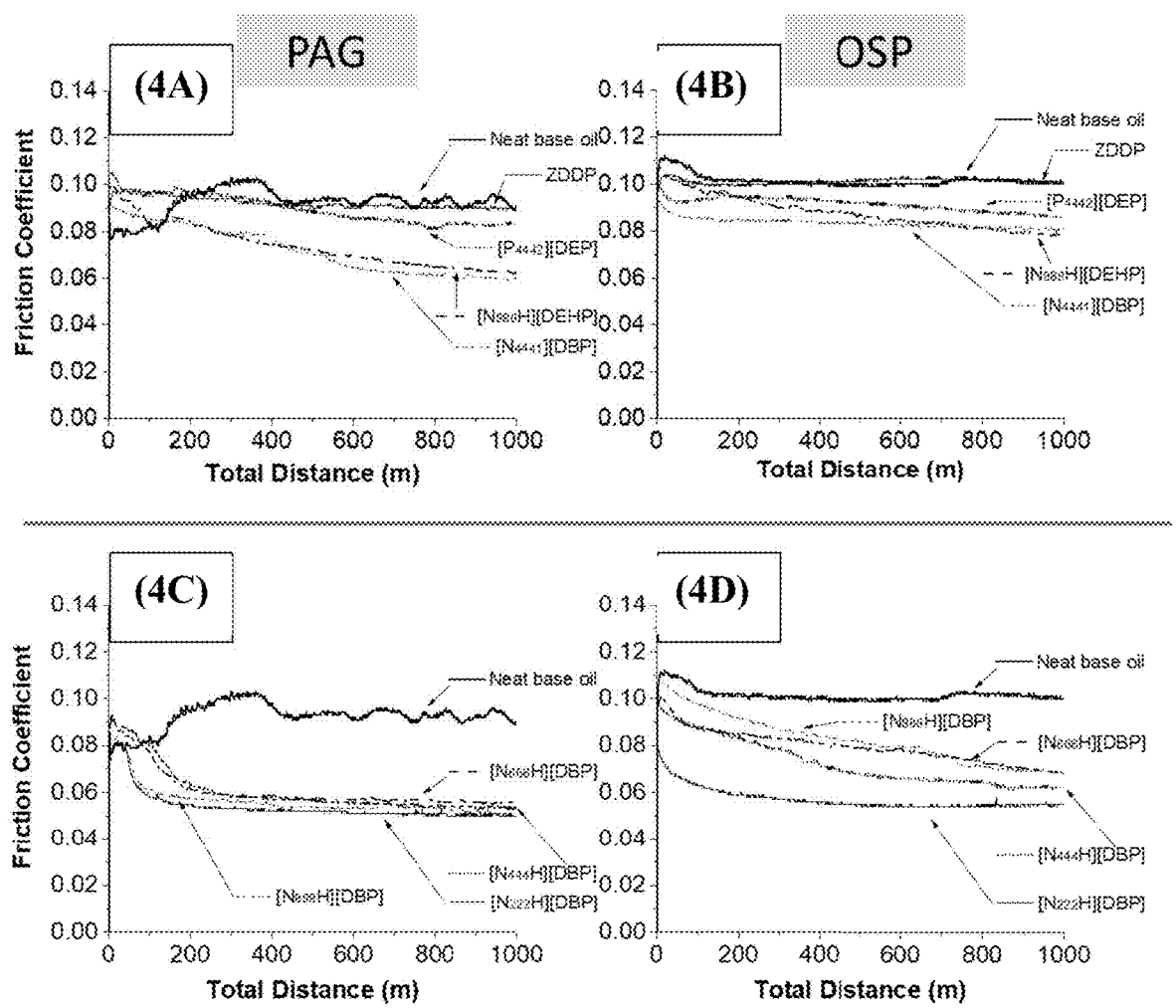
FIGS. 4A-4H. Plots showing friction behavior of PAG-based lubricants (left column, FIGS. 4A, 4C, 4E, and 4G) and OSP-based lubricants (right column, FIGS. 4B, 4D, 4F, and 4H) containing 0.5 wt % ZDDP or an IL, either conventional or of the invention.
Figures 4E, 4F, 4G, 4H:
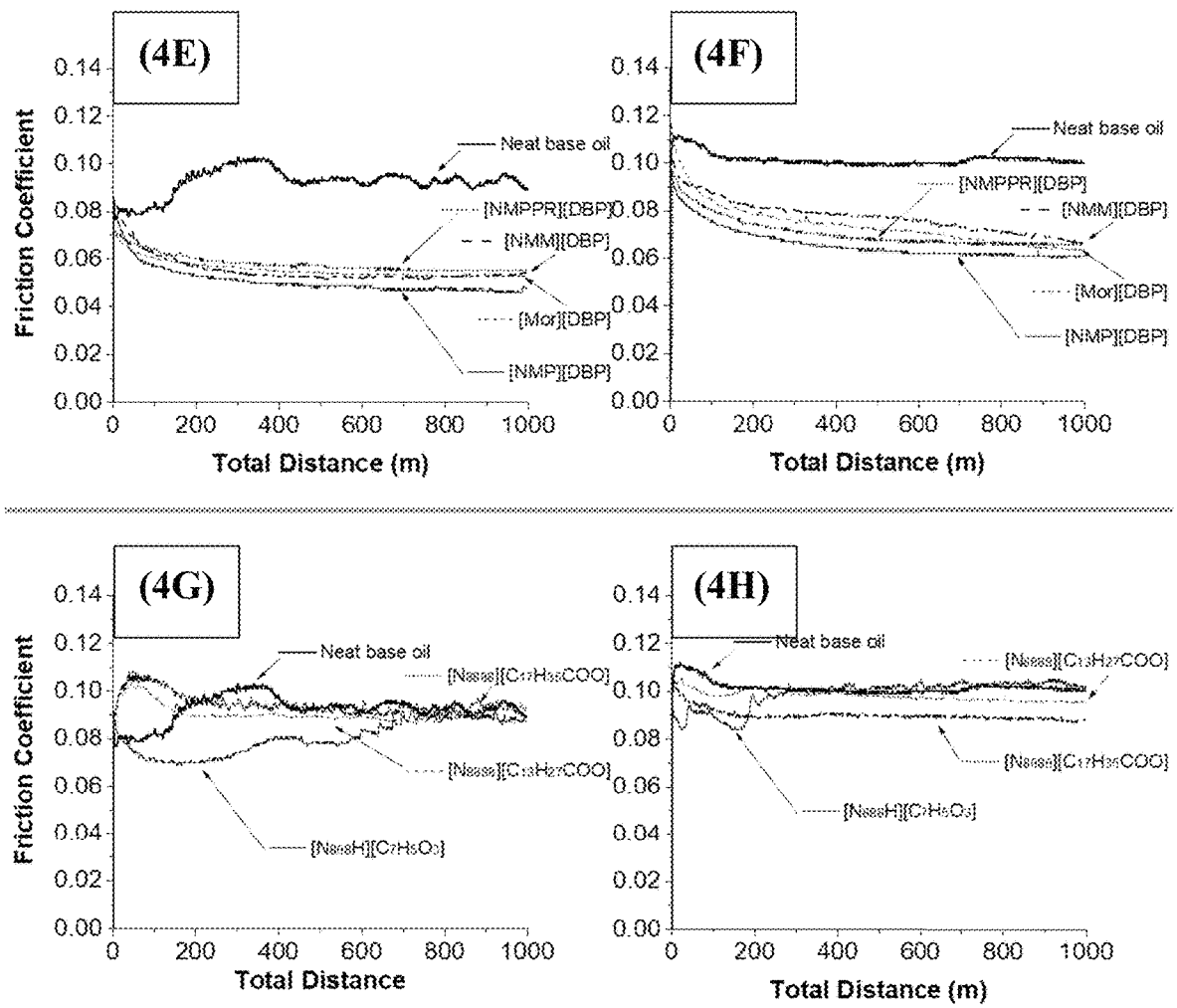
Figure 5A:
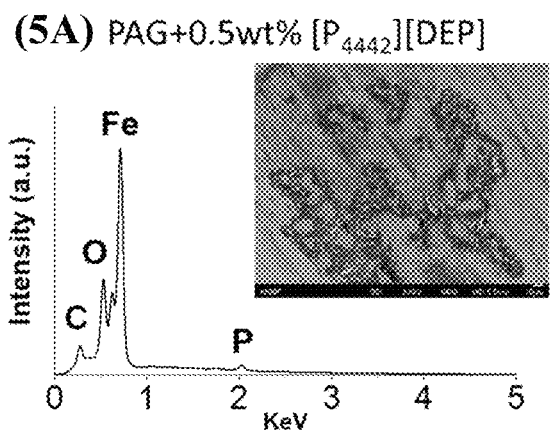
FIGS. 5A-5F. SEM images and EDS spectra of steel ball surfaces tested in PAG- and OSP-based lubricants containing: 0.5 wt % [P$_{4442}$][DBP] (FIGS. 5A and 5B, respectively); 0.5 wt % [N$_{444}$H][DBP] (FIGS. 5C and 5D, respectively); and 0.5 wt % [N$_{222}$H][DBP] and [N$_{666}$H][DBP], both in PAG (FIGS. 5E and 5F, respectively).
Figure 5B:
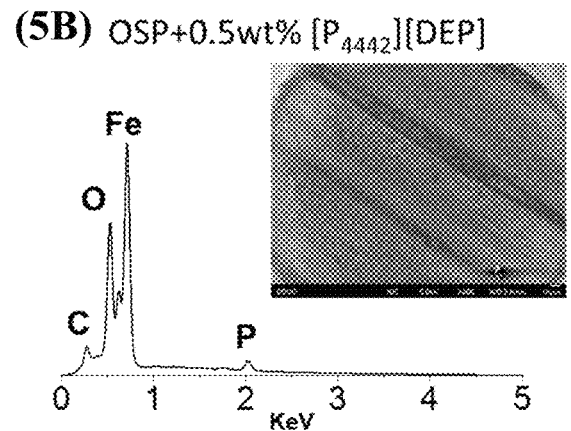
Figure 5C:
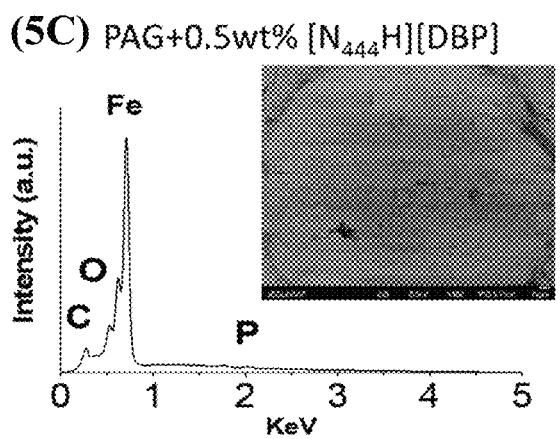
Figure 5D:
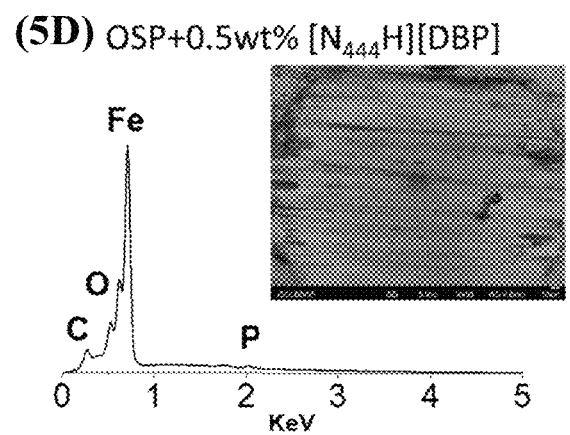
Figures 5E, 5F:
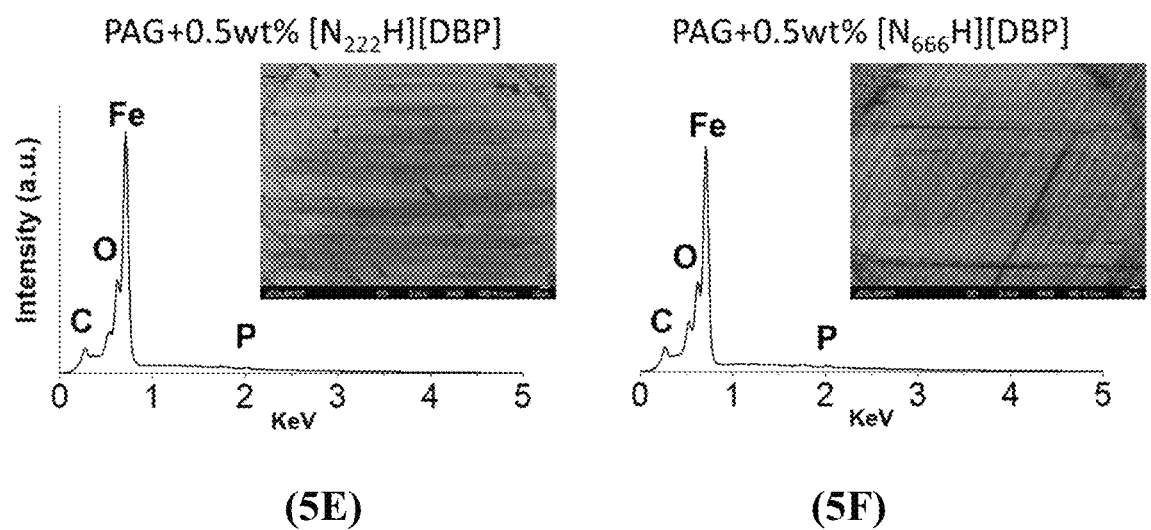

In other experiments, chronic ecotoxicity tests using a standard EPA protocol were conducted by exposing the freshwater crustacean *Ceriodaphnia dubia* (*Daphnia*) to PAG-based lubricants at 10 ppm concentration, as illustrated in FIG. 2A. PAG was used as the base stock in the aquatic toxicity tests due to its water solubility. Neat PAG was used as the baseline and each test fluid contained an additive at 5 wt. %, resulting in a 0.5 ppm concentration of each additive in the test water. New candidate ILs were tested side-by-side against the commercial ZDDP and two comparative ILs, $[P_{8888}][DEHP]$ and $[N_{888}H][DEHP]$.

FIG. 2B summarizes the survival and reproduction data of *Daphnia* in the 7-day chronic toxicity tests. Tables 3 and 4 below provide further detailed data on *Daphnia* survival and reproductive rates.

TABLE 3

Number of surviving *Daphnia* during the 7-day EPA standard chronic toxicity tests. Each treatment started with 10 individuals.

| | Treatment Name | Day 1 | Day 2 | Day 3 | Day 4 | Day 5 | Day 6 | Day 7 |
|---|---|---|---|---|---|---|---|---|
| Group I | Control I | 10 | 10 | 10 | 10 | 10 | 10 | 10 |
| | Neat PAG | 10 | 10 | 10 | 10 | 10 | 10 | 10 |
| | ZDDP | 8 | 0 | 0 | 0 | 0 | 0 | 0 |
| | $[P_{8888}][DEHP]$ | 10 | 0 | 0 | 0 | 0 | 0 | 0 |
| | $[N_{888}H][DEHP]$ | 9 | 6 | 0 | 0 | 0 | 0 | 0 |
| | $[P_{4442}][DEP]$ | 10 | 10 | 10 | 10 | 10 | 10 | 10 |
| | $[N_{4441}][DBP]$ | 10 | 10 | 10 | 10 | 10 | 10 | 10 |
| Group II | Control II | 10 | 10 | 10 | 10 | 10 | 10 | 10 |
| | Control III | 10 | 10 | 10 | 10 | 10 | 10 | 10 |
| | Neat PAG | 10 | 10 | 10 | 10 | 10 | 10 | 10 |
| | $[N_{444}H][DBP]$ | 10 | 10 | 9 | 9 | 9 | 9 | 9 |
| | $[N_{666}H][DBP]$ | 9 | 5 | 2 | 1 | 1 | 1 | 1 |
| | $[N_{888}H][DBP]$ | 10 | 6 | 0 | 0 | 0 | 0 | 0 |
| | $[N_{8888}][C_{17}H_{35}COO]$ | 3 | 0 | 0 | 0 | 0 | 0 | 0 |
| Group III | Control IV | 10 | 10 | 10 | 10 | 10 | 10 | 10 |
| | $[N_{222}H][DBP]$ | 10 | 10 | 9 | 9 | 9 | 9 | 9 |
| | $[N_{444}H][DBP]$ | 10 | 10 | 9 | 9 | 9 | 9 | 9 |
| | [NMM][DBP] | 10 | 10 | 7 | 7 | 7 | 7 | 7 |
| | [NMPPR][DBP] | 10 | 10 | 10 | 9 | 9 | 9 | 9 |
| | [Mor][DBP] | 10 | 10 | 10 | 9 | 9 | 9 | 9 |

TABLE 4

Total reproductive output (number of neonates) in surviving *Daphnia* in each treatment

| | Treatment Name | Day 1 | Day 2 | Day 3 | Day 4 | Day 5 | Day 6 | Day 7 | Total |
|---|---|---|---|---|---|---|---|---|---|
| Group I | Control I | 0 | 0 | 40 | 30 | 73 | 95 | 127 | 365 |
| | Neat PAG | 0 | 0 | 32 | 2 | 91 | 128 | 175 | 428 |
| | ZDDP | 0 | 0 | 0 | 0 | 0 | 0 | 0 | 0 |
| | $[P_{8888}][DEHP]$ | 0 | 0 | 0 | 0 | 0 | 0 | 0 | 0 |
| | $[N_{888}H][DEHP]$ | 0 | 0 | 0 | 0 | 0 | 0 | 0 | 0 |
| | $[P_{4442}][DEP]$ | 0 | 0 | 45 | 13 | 82 | 141 | 172 | 453 |
| | $[N_{4441}][DBP]$ | 0 | 0 | 36 | 0 | 98 | 159 | 201 | 494 |
| Group II | Control II | 0 | 0 | 55 | 110 | 64 | 77 | 154 | 460 |
| | Control III | 0 | 0 | 56 | 83 | 35 | 123 | 164 | 461 |
| | Neat PAG | 0 | 0 | 45 | 102 | 13 | 145 | 171 | 476 |
| | $[N_{444}H][DBP]$ | 0 | 0 | 58 | 89 | 56 | 61 | 141 | 405 |
| | $[N_{666}H][DBP]$ | 0 | 0 | 0 | 0 | 0 | 0 | 3 | 3 |
| | $[N_{888}H][DBP]$ | 0 | 0 | 0 | 0 | 0 | 0 | 0 | 0 |
| | $[N_{8888}][C_{17}H_{35}COO]$ | 0 | 0 | 0 | 0 | 0 | 0 | 0 | 0 |
| Group III | Control IV | 0 | 0 | 42 | 107 | 50 | 152 | 201 | 552 |
| | $[N_{222}H][DBP]$ | 0 | 0 | 46 | 96 | 45 | 128 | 180 | 495 |
| | $[N_{444}H][DBP]$ | 0 | 0 | 41 | 101 | 31 | 134 | 199 | 506 |
| | [NMM][DBP] | 0 | 0 | 43 | 77 | 2 | 141 | 165 | 428 |
| | [NMPPR][DBP] | 0 | 0 | 47 | 118 | 0 | 167 | 197 | 529 |
| | [Mor][DBP] | 0 | 0 | 36 | 106 | 9 | 170 | 171 | 492 |

As evidenced by the data, *Daphnia* in the water containing 10 ppm of neat PAG (without any additive) exhibited 100% survival. However, 100% mortality was observed within 24 hours when 0.5 ppm of the conventional ZDDP was introduced. Similarly, $[P_{8888}][DEHP]$ and $[N_{888H}]$ [DEHP], killed all *Daphnia* after one and three days of exposure, respectively. Results of the new candidate ILs showed strong dependence on the structure of substituent groups and the side alkyl chain length, confirming the present design strategy. Short chain aprotic alkyl ILs, [N$_{4441}$][DBP] and [P$_{4442}$][DEP], did not cause any mortality. The protic alkyl IL [N$_{444H}$][DBP], with a similar structure to [N$_{4441}$][DBP], led to 90% survival of *Daphnia*. It is herein hypothesized that a protic cation may slightly increase the acidity, which possibly is harmful to *Daphnia*. Two other protic ILs with longer side alkyl chains from the same family, [N$_{666H}$][DBP] and [N$_{888H}$][DBP], showed clearly increased toxicity, with 10% and 0% survival rates for *Daphnia*, respectively. *Daphnia* had survival rates between 70% and 90% when exposed to the three cyclic ammonium phosphates, [NMPPR] [DBP], [NMM] [DBP], and [Mor][DBP], where NMP=N-Methyl-Pyrrolidinium, NMPPR=N-Methyl-Piperidinium, NMM=N-Methyl-Morpholinium, and Mor=Morpholinium. No *Daphnia* survived for three days in the presence of [N$_{8888}$][C$_{17}$H$_{35}$COO], likely attributed to the longer alkyls of the ammonium cation because a carboxylate anion is normally benign.

The sub-lethal effects, measured by effects on *Daphnia* reproduction, are summarized in the right columns in FIG. 2B. When exposed to neat PAG, *Daphnia* had an average 47.6±8.8 offspring per individual after 7 days, which is similar to the control (without treatment). Because 100% mortality was observed prior to reproductive onset in the presence of ZDDP, [P$_{8888}$] [DEHP], and [N$_{888H}$] [DEHP], no reproduction was observed. In contrast, *Daphnia*, which maintained >70% survival rate in exposure to the new candidate ILs [N$_{4441}$] [DBP], [P$_{4442}$][DEP], [N$_{444H}$][DBP], [NMPPR][DBP], [NMM][DBP], and [Mor][DBP], showed similar reproduction rates (40-50/individual) to that in the water containing the neat PAG. The slightly increased number of offspring after exposure to PAG and certain ILs could be either test-to-test variations or a sign of stimulation that remains to be further investigated. The longer-alkyl ammonium ILs, [N$_{666H}$][DBP], [N$_{888H}$][DBP], and [N$_{8888}$][C$_{17}$H$_{35}$COO], not only had lower survival tests but reduced or halted reproduction.

Tribological Testing

The tribological behavior of candidate lubricants, base oil plus 0.5 wt % additive, was tested under boundary lubrication with a reciprocating ball-on-flat configuration on a tribometer. A hardened (HRC 60) M2 tool steel bar of 25.4 mm diameter was sliced into discs that had a 25.4 mm diameter and were 3.2 mm thick to use as the flat specimens. The M2 steel discs were polished with SiC fine grit sandpaper to reach a roughness (R$_a$) in the range of 60-70 nm. AISI 52100 bearing steel balls (10 mm diameter) were used as the counterface sliding against the M2 steel discs, which has a roughness in the range of 25-50 nm (R$_a$). Thus, the composite roughness $$\sigma\left(\sqrt{R_{q,ball}^2 + R_{q,flat}^2}\right)$$

is estimated to be 80-110 nm at contact, as R$_q$ typically is 30% higher than R$_a$. Both surfaces were cleansed with isopropanol to remove contaminants. The sliding tests were performed with a constant load of 100 N, which corresponds to a Hertzian contact pressure of about 2.1 GPa at the beginning of the test. The oscillation frequency used was 10 Hz and the sliding stroke was 10 mm. All tribotests were conducted for 1000 m of sliding at a temperature of 180° F. (82° C.), a typical operating temperature of hydraulic fluids. The ratio of lubrication film thickness (h) to the composite roughness σ, known as λ ratio (h/σ), was calculated to be <1 in such testing conditions, ensuring boundary lubrication (B. J. Hamrock, et al., *J. of Lubrication Tech.*, 104(2):279-281, April 1982).

Surface Characterization

The friction force was measured in-situ during the test. After the test, the residue oil was rinsed off with isopropanol and the wear volume was measured using a 3D optical profilometry. Wear scars were investigated using scanning electron microscopy (SEM) and energy-dispersive spectroscopy (EDS) on a scanning electron microscope (SEM) equipped with an EDAX system. To obtain the chemical composition of the outermost layer, EDS analysis was performed at a potential of 5.0 kV over a constant time of 100 sec. A K-Alpha XPS system was used to conduct X-ray photoelectron spectroscopy (XPS) analysis on selected tribofilms. The XPS depth profiles of tribofilms were obtained by using an argon-ion sputter gun at 2.0 keV to remove the tribofilm layer-by-layer at 3-5 nm a time. FIB was used to lift out thin cross-sections of selected tribofilms to permit STEM nanostructural examination and EDS chemical analysis.

Lubricity Testing

Boundary lubrication tests were conducted on the new candidate ILs in two EAL base oils, PAG and OSP, at 0.5 wt. % (a typical concentration of anti-wear additives in hydraulic fluids). Friction behavior and wear rate are compared in FIGS. 3A-3C and 4A-4H, and Table 5 below. The lubricity depends on the ILs' chemistry and molecular structures. [P$_{4442}$][DEP] performed comparably to the ZDDP. The new alkyl and cyclic ammonium-phosphate ILs, both aprotic and protic, and regardless of the alkyl chain length, significantly reduced both friction and wear, when added into PAG at 0.5% concentration. They outperformed the commercial ZDDP by 20-30% additional friction reduction and 80-90% additional wear reduction. The carboxylate IL, however, appeared to be incompatible with PAG, causing substantially higher wear loss.

TABLE 5

Wear rates of the 52100 steel balls after tribological tests in the experimental lubricants (neat base oil or base oil containing 0.5 wt % additive)

| Wear rate ($10^{-9}$ mm$^3$/N-m) | PAG | OSP |
|---|---|---|
| Neat base oil | 2.21$^{±0.80}$ | 4.01$^{±1.12}$ |
| Base oil + 0.5 wt. % additive as listed below | | |
| ZDDP | 1.42$^{±0.25}$ | 1.78$^{±0.22}$ |
| [N$_{888}$H][DEHP] | 0.16$^{±0.04}$ | 0.24$^{±0.02}$ |
| [N$_{4441}$][DBP] | 0.12$^{±0.03}$ | 0.15$^{±0.02}$ |
| [P$_{4442}$][DEP] | 1.45$^{±0.57}$ | 1.62$^{±0.27}$ |
| [N$_{222}$H][DBP] | 0.13$^{±0.03}$ | 0.16$^{±0.02}$ |
| [N$_{444}$H][DBP] | 0.13$^{±0.01}$ | 0.27$^{±0.02}$ |
| [N$_{666}$H][DBP] | 0.11$^{±0.01}$ | 0.36$^{±0.05}$ |
| [N$_{888}$H][DBP] | 0.16$^{±0.08}$ | 0.49$^{±0.09}$ |
| [NMP][DBP] | 0.31$^{±0.02}$ | 0.60$^{±0.07}$ |
| [NMPPR][DBP] | 0.26$^{±0.01}$ | 0.43$^{±0.09}$ |
| [NMM][DBP] | 0.17$^{±0.01}$ | 0.27$^{±0.01}$ |
| [Mor][DBP] | 0.22$^{±0.01}$ | 0.35$^{±0.02}$ |
| [N$_{888}$H][C$_7$H$_5$O$_3$] | 14.45$^{±4.15}$ | 11.20$^{±2.21}$ |
| [N$_{8888}$][C$_{17}$H$_{35}$COO] | 4.97$^{±0.59}$ | 5.82$^{±0.44}$ |
| [N$_{8888}$][C$_{13}$H$_{27}$COO] | 2.45$^{±0.43}$ | 3.69$^{±0.62}$ |

The new candidate ILs also exhibited excellent lubricity when added to OSP (FIGS. 4A-4H and Table 5). The friction coefficient and wear rate of OSP-based fluids were generally higher than those of PAG-based fluids, possibly due to the weaker adsorption of the OSP molecules onto the contact surfaces (less polar than PAG).

Friction Reducing and Anti-Wear Mechanism

ILs provide wear protection by forming a self-healing tribofilm on the contact surface (Y. Zhou et al., *Sci. Rep.*, 1-8, 2017). The morphology of selected steel ball wear scars is shown in FIGS. 5A-5F and correlated with the tribological behavior presented in FIGS. 3A-3C. The foregoing indicates that a tribofilm with higher surface coverage and more uniform distribution on the contact area is generally associated with lower friction and less wear loss.

Figures 6A, 6B:
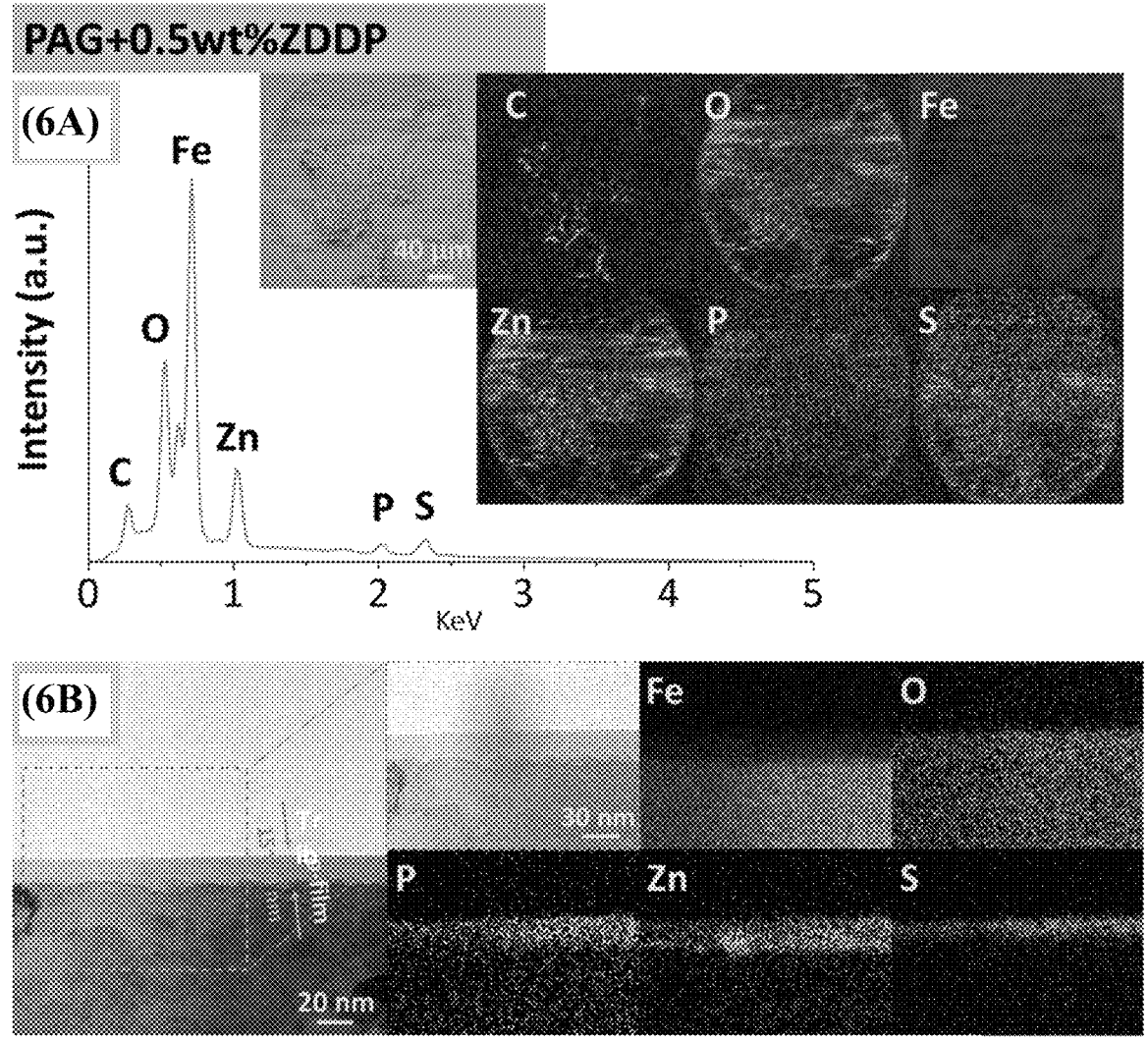
FIGS. 6A-6F. Characterization of the tribofilms formed by PAG+0.5 wt. % ZDDP and PAG+0.5 wt. % [N$_{4441}$][DBP].
Figure 6C:
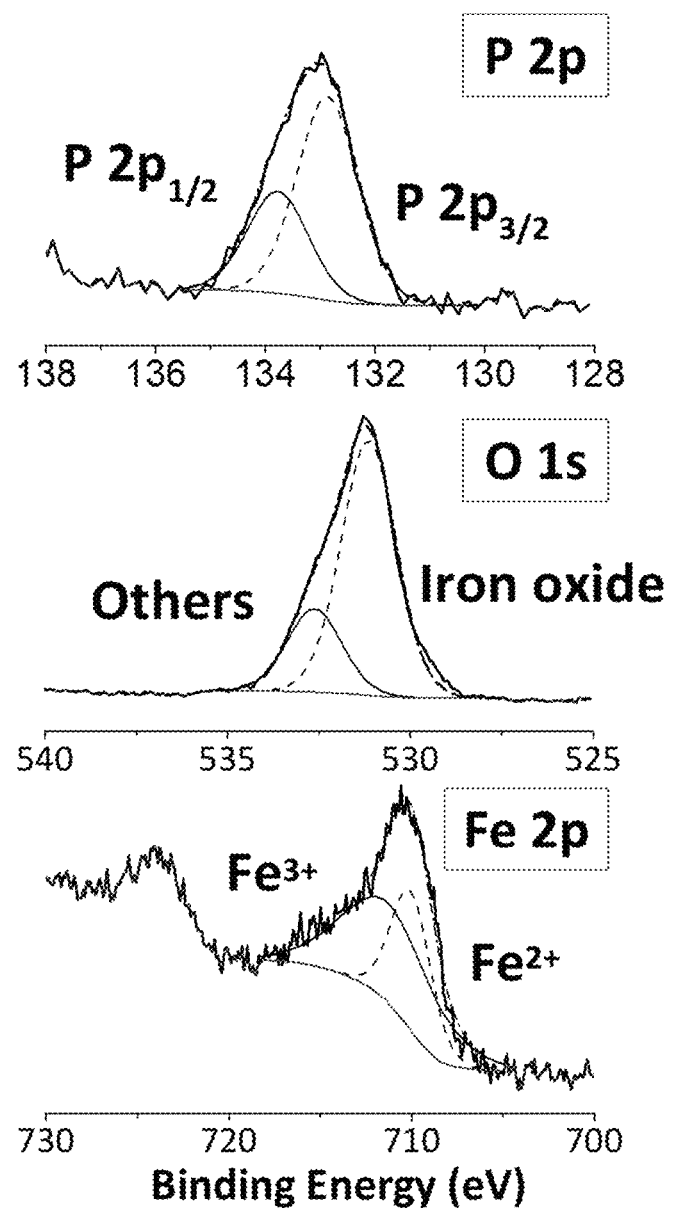
Figures 6D, 6E:
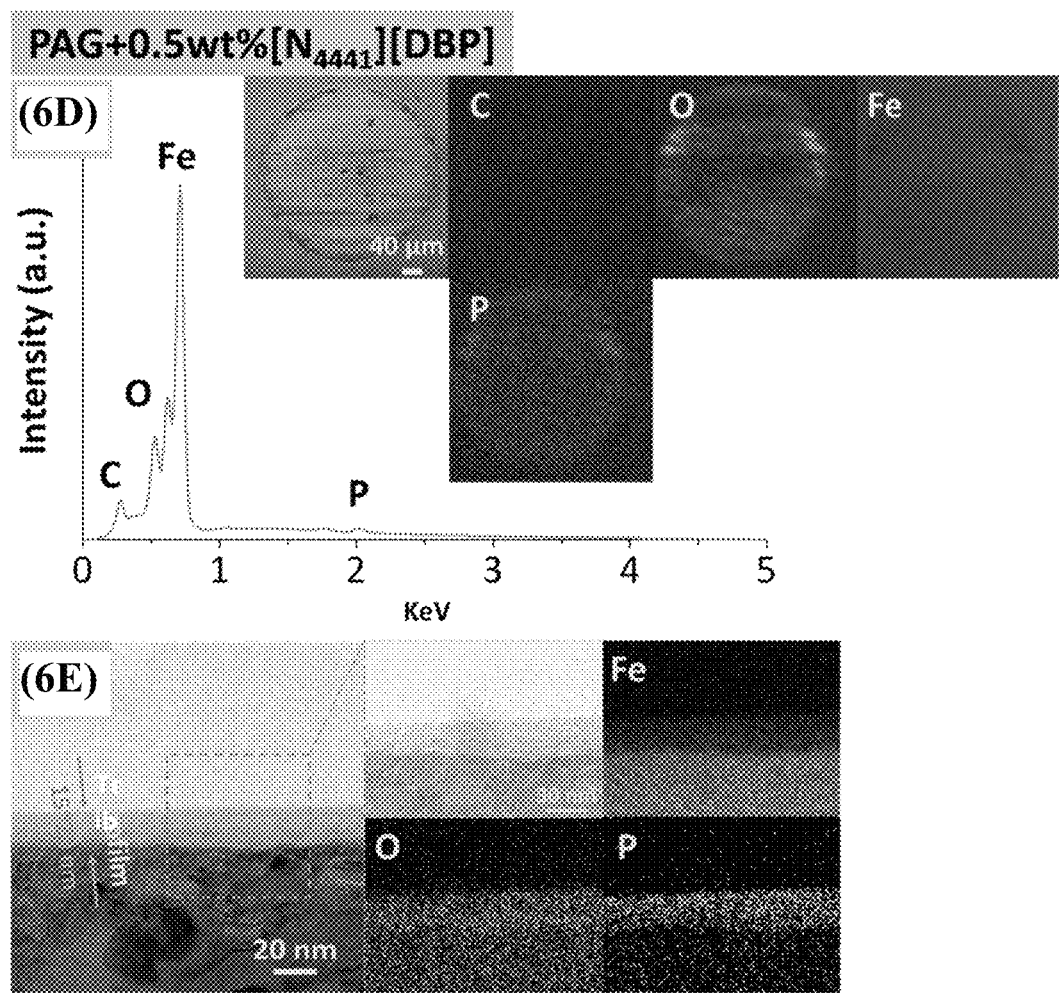
Figure 6F:
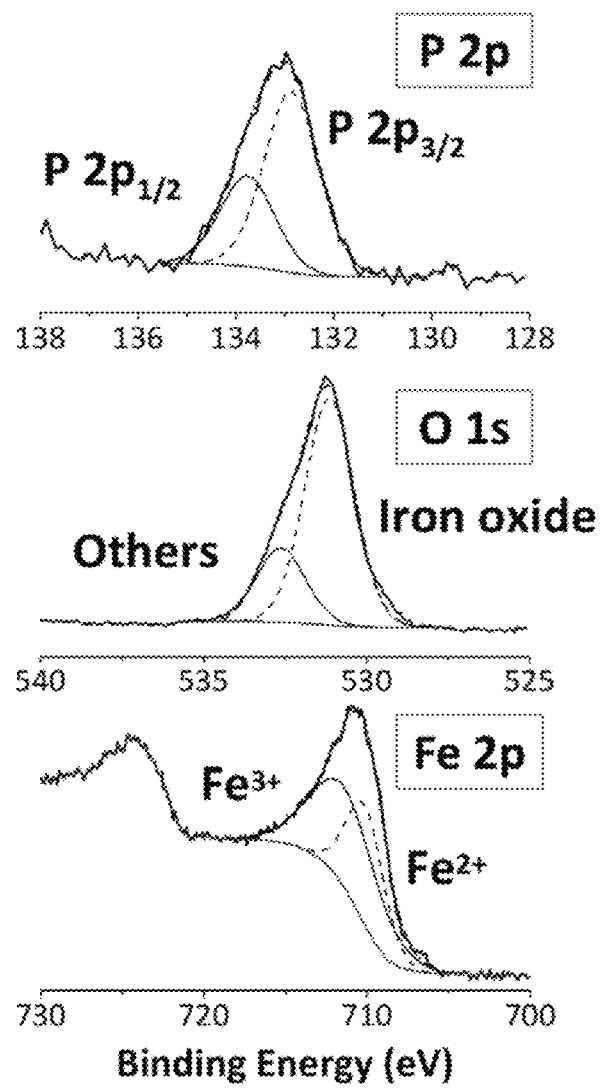

To further understand the superior lubricity of [$N_{4441}$][DBP], selected worn surfaces were characterized using scanning electron microscopy (SEM) and energy-dispersive X-ray spectroscopy (EDS). FIGS. 6A and 6D compare the SEM morphological images and EDS elemental maps of the wear scars lubricated by PAG+0.5% ZDDP and PAG+0.5% [$N_{4441}$][DBP], respectively. It was found that the ZDDP tribofilm was rough with uneven surface coverage. In contrast, the tribofilm created by [$N_{4441}$][DBP] was smoother and more uniformly distributed, which explains the lower friction and wear. Further, scanning transmission electron microscopy (STEM) was used for cross-sectional examination of the tribofilms. While the thicknesses of the ZDDP and [$N_{4441}$][DBP] tribofilms are similar (15-20 nm), the composition distribution of the IL tribofilm appeared to be more uniform than that of the ZDDP tribofilm, as compared in FIGS. 6B and 6E. FIG. 6F shows the binding energies of key elements of the [$N_{4441}$][DBP] tribofilms, which suggest a mixture of iron oxides and phosphates, similar to the composition reported for the tribofilm formed by [$N_{888H}$][DBP] (W. C. Barnhill et al., Tribal. Lett., 63, 22, 2016).

In summary, the above results demonstrate candidate eco-friendly ILs as novel friction-reducing and anti-wear additives for lubrication. EPA standard chronic aquatic toxicity tests were conducted and *Daphnia* had 70-100% survival rates when exposed to the new short alkyl chain (C<4) candidate ILs, but zero survival when exposed to a commercial ZDDP or longer alkyl chain (C>4) ILs. In lubricity evaluation, alkyl and cyclic ammonium phosphate ILs outperformed ZDDP by additional 20-30% friction reduction and 80-90% wear reduction. Characterization revealed a smoother and more uniform tribofilm formed by [$N_{4441}$][DBP] than that by the ZDDP, explaining the improved lubricity. Combining the toxicity and lubricity results, [$N_{4441}$][DBP] appeared to be the best candidate.

While there have been shown and described what are at present considered the preferred embodiments of the invention, those skilled in the art may make various changes and modifications which remain within the scope of the invention defined by the appended claims.

What is claimed is:

1. A lubricant composition comprising:
(i) an ionic liquid selected from the group consisting of:

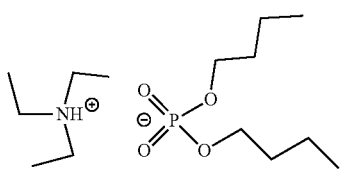
[$N_{222}H$][DBP]

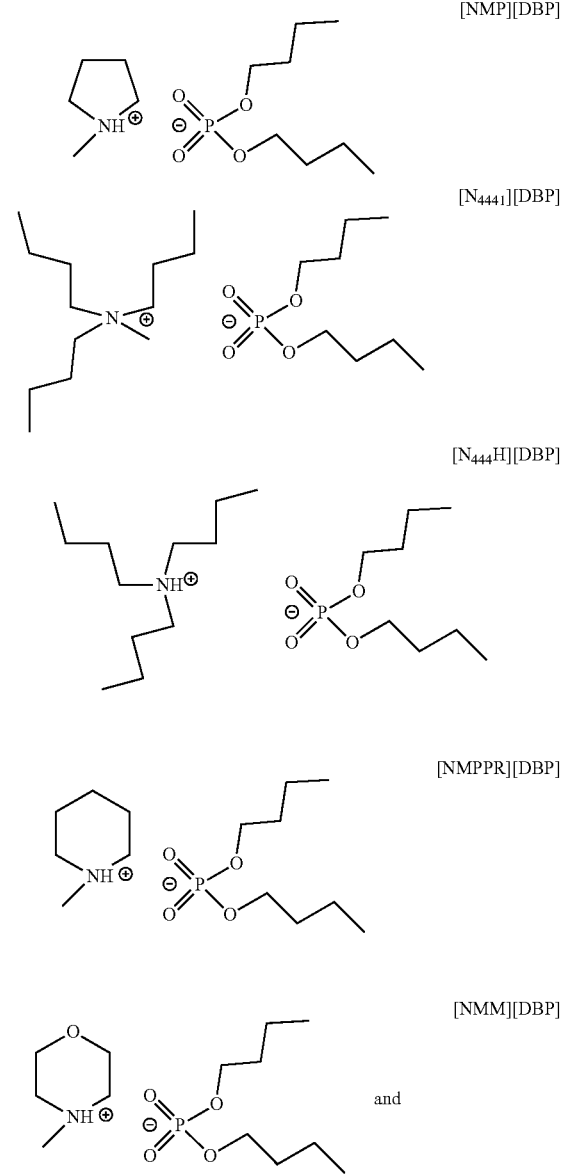

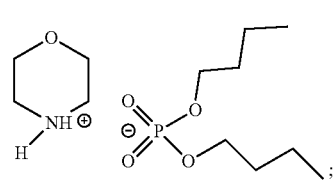

and (ii) a base lubricant selected from the group consisting of polyalkylene glycols, vegetable oils, synthetic ester oils, polyalphaolefins, and water;
wherein said ionic liquid is dissolved in said base lubricant and is included in said lubricant composition in a concentration in a range of 0.1-5 wt %, wherein the concentrations in said range are substantially non-toxic to aquatic life.

2. A lubricant composition comprising:

(i) an ionic liquid having the following formula:

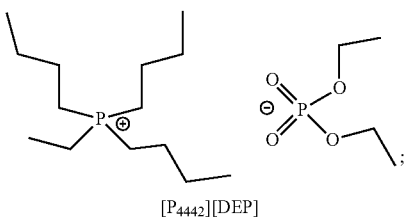

[P$_{4442}$][DEP]

and (ii) a polyalkylene glycol base lubricant;

wherein said ionic liquid is dissolved in said base lubricant and is included in said lubricant composition in a concentration in a range of 0.1-5 wt %, wherein the concentrations in said range are substantially non-toxic to aquatic life.

3. The lubricant composition of claim 1, wherein said ionic liquid is included in said lubricant composition in an amount of 0.1-3 wt %.

4. The lubricant composition of claim 1, wherein said ionic liquid is included in said lubricant composition in an amount of 0.1-2 wt %.

5. The lubricant composition of claim 1, wherein said ionic liquid is included in said lubricant composition in an amount of 0.1-1 wt %.

6. The lubricant composition of claim 1, wherein said base lubricant comprises a polyalkylene glycol.

7. The lubricant composition of claim 1, wherein said base lubricant comprises a vegetable oil.

8. The lubricant composition of claim 1, wherein said base lubricant comprises a synthetic ester oil.

9. The lubricant composition of claim 1, wherein said base lubricant comprises a polyalphaolefin.

10. The lubricant composition of claim 1, wherein said base lubricant comprises water.

11. The lubricant composition of claim 1, wherein said ionic liquid is included in said lubricant composition in an amount of 0.5-5 wt %.

* * * * *